US011845502B2

(12) United States Patent
Hilman et al.

(10) Patent No.: US 11,845,502 B2
(45) Date of Patent: Dec. 19, 2023

(54) REMOVABLE UNIVERSAL LATERAL TRACK EXTENSION SYSTEM

(71) Applicants: Tom Hilman, Vancouver, WA (US); Melvin Aho, Vancouver, WA (US)

(72) Inventors: Tom Hilman, Vancouver, WA (US); Melvin Aho, Vancouver, WA (US)

( * ) Notice: Subject to any disclaimer, the term of this patent is extended or adjusted under 35 U.S.C. 154(b) by 0 days.

(21) Appl. No.: 18/011,756

(22) PCT Filed: Jul. 1, 2021

(86) PCT No.: PCT/US2021/040216
§ 371 (c)(1),
(2) Date: Dec. 20, 2022

(87) PCT Pub. No.: WO2022/006481
PCT Pub. Date: Jan. 6, 2022

(65) Prior Publication Data
US 2023/0234651 A1    Jul. 27, 2023

Related U.S. Application Data

(60) Provisional application No. 63/047,202, filed on Jul. 1, 2020.

(51) Int. Cl.
*B62D 55/084* (2006.01)
*B62D 55/12* (2006.01)
*B62D 55/065* (2006.01)

(52) U.S. Cl.
CPC ......... *B62D 55/084* (2013.01); *B62D 55/065* (2013.01); *B62D 55/12* (2013.01)

(58) Field of Classification Search
CPC ..... B62D 55/065; B62D 55/084; B62D 55/12
See application file for complete search history.

(56) References Cited

U.S. PATENT DOCUMENTS

| | | | |
|---|---|---|---|
| 1,963,408 A | | 6/1934 | Huston |
| 2,154,377 A | * | 4/1939 | Cory .................... B62D 55/065 180/9.1 |
| 3,371,733 A | * | 3/1968 | Kehler ................. B62D 55/065 180/9.1 |

(Continued)

FOREIGN PATENT DOCUMENTS

| | | | | |
|---|---|---|---|---|
| CN | 105966477 A | * | 9/2016 | ........... B62D 55/065 |
| CN | 106005071 A | * | 10/2016 | ........... B62D 55/065 |

(Continued)

*Primary Examiner* — Kip T Kotter
(74) *Attorney, Agent, or Firm* — Mark E. Beatty; Rylander & Associates P.C.

(57) ABSTRACT

A universal removable lateral track extension system includes an extension track assembly removably couplable outboard of an original lateral track at a selected displacement width, the assembly further including a track frame plate, first and second receiver hitches, a drive coupler removably couplable to the corresponding drive sprocket of the tracked equipment, the drive coupler including a drive bearing assembly and connected drive sprocket in line with the extension track track rollers, a drive sprocket coupler and extension axle removably couplable from the drive sprocket connector to the drive bearing assembly, and a continuous track extending around the extension track track rollers and drive coupler.

7 Claims, 27 Drawing Sheets

(56) References Cited

U.S. PATENT DOCUMENTS

| | | | | |
|---|---|---|---|---|
| 3,456,750 A | * | 7/1969 | Kehler | B62D 55/065 |
| | | | | 180/9.1 |
| 3,512,598 A | * | 5/1970 | Shatoska | B62D 55/084 |
| | | | | 180/9.48 |
| 3,820,616 A | | 6/1974 | Juergens | |
| 5,293,949 A | | 3/1994 | Zimmermann | |
| 5,573,071 A | * | 11/1996 | Wilson | A01C 7/00 |
| | | | | 172/438 |
| 6,145,610 A | | 11/2000 | Gallignani | |
| 2005/0155798 A1 | * | 7/2005 | Chang | B62D 55/065 |
| | | | | 180/9.32 |
| 2009/0229894 A1 | | 9/2009 | Roucka | |
| 2011/0061951 A1 | * | 3/2011 | Gal | B62D 55/065 |
| | | | | 180/8.7 |
| 2014/0367181 A1 | * | 12/2014 | Van Mill | B62D 55/08 |
| | | | | 180/9.1 |
| 2016/0326716 A1 | | 11/2016 | Yamamoto et al. | |

FOREIGN PATENT DOCUMENTS

| | | | | |
|---|---|---|---|---|
| CN | 110386199 A | * | 10/2019 | B62D 55/0882 |
| EP | 1442968 A1 | * | 8/2004 | B62D 49/0607 |
| JP | 60166570 A | * | 8/1985 | |

* cited by examiner

REMOVABLE UNIVERSAL LATERAL TRACK EXTENSION SYSTEM

CLAIM OF PRIORITY

This application claims priority to U.S. Provisional Patent Application Ser. No. 63/047,202, filed Jul. 1, 2020, in its entirety, and the disclosure of which is incorporated by reference into this Application.

FIELD OF THE INVENTION

The present invention relates to universal removable lateral track extenders for temporarily increasing the tracked surface area of tracked equipment.

BACKGROUND

Farm and construction equipment frequently use continuous tracks (often referred to as "caterpillar-style" tracks) to reduce ground pressure and provide improved traction, with a single track on each lateral side of the equipment (referred to as a two-track system). In many cases, however, even the reduced ground pressure of such two-track systems is not sufficient to ensure adequate stability and/or avoid excessive environmental damage in sensitive wetlands and riparian areas. In addition, a standard two-track system for a given weight-class of equipment is often not wide enough to laterally span typical irrigation channels and drainage ditches in order to perform efficient operations along the length of such obstacles (for example, rapid dredging of silted channels).

Hydraulic track width adjustment systems have been used, but generally these systems only allow an operator to pull the two tracks closer together in order to onload/offload the tracked vehicle from a standard carrier, or to maneuver between obstacles. Such systems do not actually reduce ground pressure nor improve lateral stability for the tracked equipment when operating in the field.

Some equipment provide extended tracks to replace the standard tracks, which are longitudinally extended. These may reduce overall ground pressure, but do not substantially improve lateral stability. Elongated tracks require replacement of the original tracks, drive gears and suspension—i.e. the entire track system—which is expensive. Additionally, longer track systems reduce the maneuverability of the equipment, and in some cases may actually reduce lateral stability due to the increased length-to-width ratio of the equipment when spanning over obstacles and uneven ground.

It is also known to either replace the original drive sprocket and track rollers with wider sets, or to add a second set of track rollers to a track system, and then replace the original track with a wider track which covers the wider track roller set. The wider tracks do reduce ground pressure, and provide marginal improvements in lateral stability, but have several drawbacks. For example, this type of system requires elevating the equipment, removing the original track, replacing the original track rollers and drive sprocket (or addition of a second set of track rollers), and re-tracking the equipment—which then requires re-tensioning the tracks and potentially adjustments to the drive system. Such systems require separate tracks—because the wider (and therefore more expensive and less widely available) tracks and track rollers and drive sprockets are not compatible with the original single-track system. Removing the wider tracks and track rollers entails the same cumbersome replacement and readjustment procedure, rendering the modifications essentially permanent. In addition to the difficulties entailed in such changeouts, the improvement in lateral stability is small, as the lateral track center-of-pressure is expanded only by the width of a single track roller. The marginal increase in lateral track separation does not substantially improve the ability to laterally span irrigation channels and drainage ditches. In addition, as the wider track spans the track rollers, there is no ability to provide lateral bracing to the wider track system reduce strain on the suspension.

Pontoon attachments have been created as well, to provide floatation in wetlands and near-shore applications, but pontoons are only useful to provide buoyancy in water. Pontoons provide no benefit in mud, nor do they provide wider span or stability when used on ground, and generally degrade operations on land, making it more difficult to perform operations transiting between shallow water and adjacent land areas.

In addition to floatation and lateral span limitations, standard tracked equipment, especially in smaller weight/size classes, have limited lateral stability. The ability to extend a given equipment's lateral footprint would greatly increase its stability when operating on sloped surfaces and when picking lateral loads.

Thus, there is a need for an apparatus for continuous track equipment that: (1) reduces ground pressure; (2) improves lateral stability for operation in soft ground, hillsides and/or for picking lateral loads; (3) increases lateral track separation to span channels and ditches; (4) is easily installed and removed so as to not interfere with normal operation of the equipment; (5) utilizes standard-size tracks and track rollers for the equipment class; and (6) is universally adaptable for equipment using the same track sizes.

SUMMARY AND ADVANTAGES

A universal removable lateral track extension system includes an extension track assembly removably couplable outboard of an original lateral track at a selected displacement width, the assembly further including a track frame plate, first and second receiver hitches, a drive coupler removably couplable to the corresponding drive sprocket of the tracked equipment, the drive coupler including a drive bearing assembly and connected drive sprocket in line with the extension track track rollers, a drive sprocket coupler and extension axle removably couplable from the drive sprocket connector to the drive bearing assembly, and a continuous track extending around the extension track track rollers and drive coupler.

The system described and claimed herein presents numerous advantages over existing apparatus and methods. The track extensions double the track surface area in contact with the ground—under normal circumstances—so reduce ground pressure by 50%. The track extensions increase lateral stability, both by reducing ground pressure (thus reducing risk of one side sinking in soft ground) and by increasing the effective track width, which increases the righting arm and moment of inertia of the vehicle—especially important when imposing side loads on the vehicle or working on inclined surfaces. The track extensions permit the vehicle to span wider channels and ditches, allowing much improved efficiency for operations such as dredging irrigation channels and digging irrigation and drainage channels. The track extensions are easily installed and removed so as to not interfere with normal operation of the equipment. The system utilizes standard-size tracks and track rollers for the equipment class, using continuous tracks and track rollers of the same dimensions as the equipment. The system is universally adaptable for equipment using the same track sizes—for retrofitting or OEM equipment preconfigured to receive removable extension tracks.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DRAWING REFERENCE NUMBERS

Figure 1:
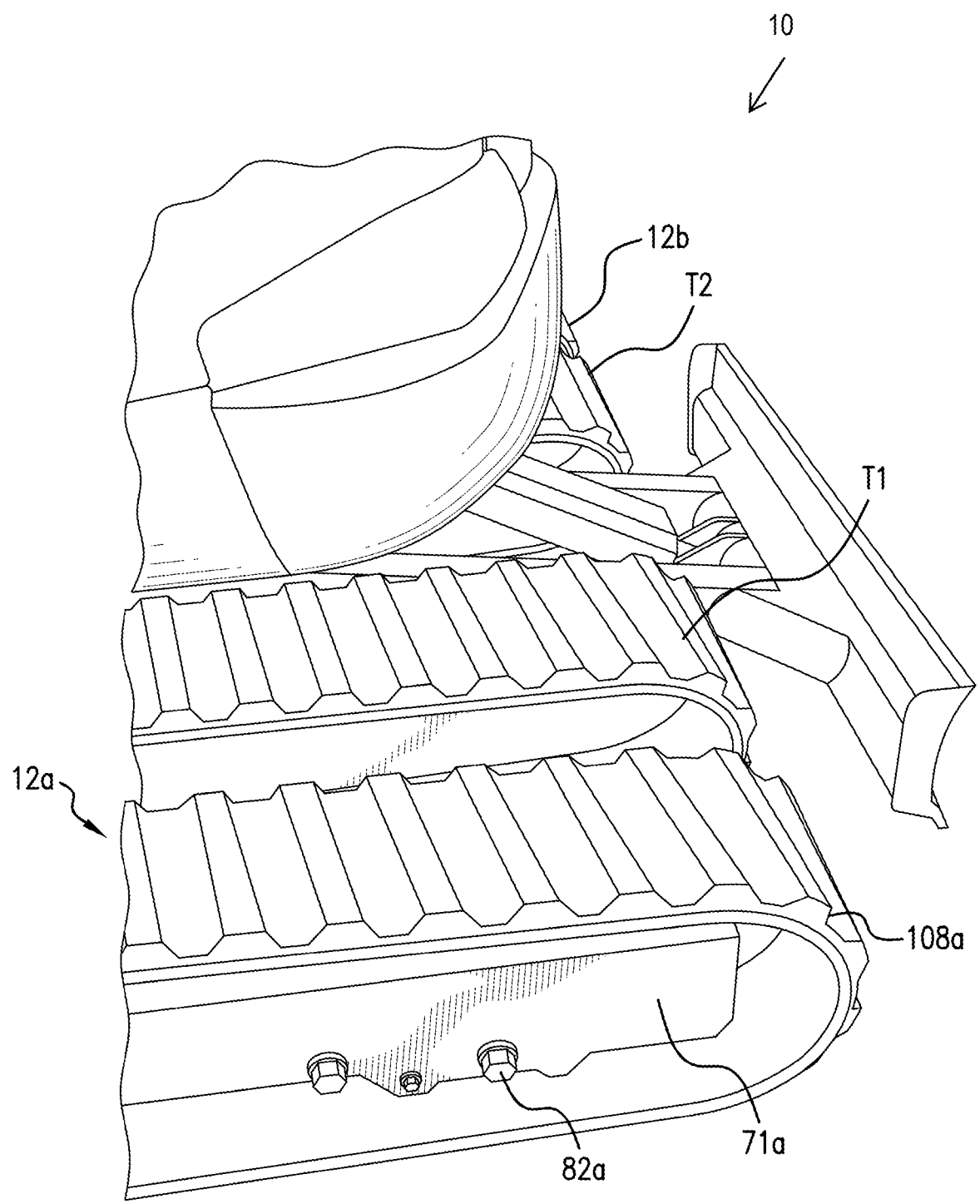
FIG. 1 shows a partial port side aft view of a first embodiment.

| Ref. Nr. | Description |
| --- | --- |
| 10 | First Described Embodiment |
| 12a | First Extension Track Assembly |
| 14a | First Extension Track Frame and Frame Plate |
| 16a | First Extension Track First Threaded Alignment Channel |
| 18a | First Extension Track Second Threaded Alignment Channel |
| 20a | First Extension Track First Alignment Cup |
| 22a | First Extension Track Second Alignment Cup |
| 24a | First Extension Track First Receiver Hitch |
| 26a | First Extension Track Second Receiver Hitch |
| 28a | First Extension Track First Receiver Hitch Female Portion |
| 30a | First Extension Track Second Receiver Hitch Female Portion |
| 32a | First Extension Track First Receiver Hitch Male Portion |
| 34a | First Extension Track Second Receiver Hitch Male Portion |
| 36a | First Extension Track First Receiver Hitch Female Portion First End |
| 38a | First Extension Track Second Receiver Hitch Female Portion First End |
| 40a | First Extension Track First Receiver Hitch Female Portion Second End |
| 42a | First Extension Track Second Receiver Hitch Female Portion Second End |
| 44a | First Extension Track First Receiver Hitch Female Portion First Connection Flange |
| 46a | First Extension Track Second Receiver Hitch Female Portion First Connection Flange |
| 48a | First Extension Track First Receiver Hitch Female Portion Second Connection Flange |
| 50a | First Extension Track Second Receiver Hitch Female Portion Second Connection Flange |
| 52a | First Extension Track First Receiver Hitch Female Portion Receiving Aperture |
| 54a | First Extension Track Second Receiver Hitch Female Portion Receiving Aperture |
| 56a | First Extension Track First Receiver Hitch Female Portion Top Extension Flange Plate |
| 58a | First Extension Track Second Receiver Hitch Female Portion Top Extension Flange Plate |
| 60a | First Extension Track Frame Plate First Portion |
| 62a | First Extension Track Frame Plate Second Portion |
| 64a | First Extension Track Rollers |
| 66a | (not used) |
| 68a | First Extension Track Receiver Hitch Female Portion Engagement Points |
| 70a | First Extension Track Inboard Frame Plate |
| 71a | First Extension Track Outboard Frame Plate |
| 72a | First Extension Track First Receiver Hitch Female Portion First Attachment Flange Top Follower Plate |
| 74a | First Extension Track Second Receiver Hitch Female Portion First Attachment Flange Top Follower Plate |
| 76a | First Truss Bolt Extension Plate |
| 78a | Second Truss Bolt Extension Plate |
| 80a | First Truss Bolt |
| 82a | Second Truss Bolt |
| 84a | First Truss Bolt Receiver |
| 86a | Second Truss Bolt Receiver |
| 88a | First Extension Track First Receiver Hitch First Locking Lug |
| 90a | First Extension Track Second Receiver Hitch First Locking Lug |
| 92a | First Extension Track First Receiver Hitch Second Locking Lug |
| 94a | First Extension Track Second Receiver Hitch Second Locking Lug |
| 96a | First Extension Track Drive Coupler |
| 98a | First Extension Track Drive Coupler Hub Cover |
| 100a | First Extension Track Drive Bearing Assembly |
| 102a | First Extension Track Drive Shaft Extension Axle |
| 104a | (not used) |
| 106a | First Extension Track Drive Bearing Assembly Bearing Race and Bearing |

| Ref. Nr. | Description |
| --- | --- |
| 108a | First Extension Track Continuous Track |
| 110a | First Extension Track Drive Sprocket |
| 112a | First Extension Track Drive Shaft Extension Axle End Block |
| 114a | First Extension Track Drive Shaft Extension Axle Receiver |
| 116a | First Extension Track Drive Coupler Torque Plate |
| 118a | First Extension Track Drive Coupler Hub Cover Inner Connection Flange |
| 120a | First Extension Track Drive Coupler Hub Cover Spacer/Sidewall |
| 122a | First Extension Track Drive Coupler Hub Cover Outer Connection Flange |
| 124a | (not used) |
| 126a | First Extension Track Drive Coupler Torque Plate Bolts |
| 128a | First Extension Track First Receiver Hitch Male Portion Connection Plate |
| 130a | First Extension Track Second Receiver Hitch Male Portion Connection Plate |
| 132a | First Extension Track First Receiver Hitch Male Portion Connection Plate Top Follower Plate |
| 134a | First Extension Track Second Receiver Hitch Male Portion Connection Plate Top Follower Plate |
| 136a | First Extension Track Horizontal Stiffener |
| 138a | First Extension Track Vertical Stiffener |
| 140a | D-ring |
| 12b | Second Extension Track Assembly |
| 14b | Second Extension Track Frame and Frame Plate |
| 16b | Second Extension Track First Threaded Alignment Channel |
| 18b | Second Extension Track Second Threaded Alignment Channel |
| 20b | Second Extension Track First Alignment Cup |
| 22b | Second Extension Track Second Alignment Cup |
| 24b | Second Extension Track First Receiver Hitch |
| 26b | Second Extension Track Second Receiver Hitch |
| 28b | Second Extension Track First Receiver Hitch Female Portion |
| 30b | Second Extension Track Second Receiver Hitch Female Portion |
| 32b | Second Extension Track First Receiver Hitch Male Portion |
| 34b | Second Extension Track Second Receiver Hitch Male Portion |
| 36b | Second Extension Track First Receiver Hitch Female Portion First End |
| 38b | Second Extension Track Second Receiver Hitch Female Portion First End |
| 40b | Second Extension Track First Receiver Hitch Female Portion Second End |
| 42b | Second Extension Track Second Receiver Hitch Female Portion Second End |
| 44b | Second Extension Track First Receiver Hitch Female Portion First Connection Flange |
| 46b | Second Extension Track Second Receiver Hitch Female Portion First Connection Flange |
| 48b | Second Extension Track First Receiver Hitch Female Portion Second Connection Flange |
| 50b | Second Extension Track Second Receiver Hitch Female Portion Second Connection Flange |
| 52b | Second Extension Track First Receiver Hitch Female Portion Receiving Aperture |
| 54b | Second Extension Track Second Receiver Hitch Female Portion Receiving Aperture |
| 56b | Second Extension Track First Receiver Hitch Female Portion Top Extension Flange Plate |
| 58b | Second Extension Track Second Receiver Hitch Female Portion Top Extension Flange Plate |
| 60b | Second Extension Track Frame Plate First Portion |
| 62b | Second Extension Track Frame Plate Second Portion |
| 64b | Second Extension Track Rollers |
| 66b | (not used) |
| 68b | Second Extension Track Receiver Hitch Female Portion Engagement Points |
| 70b | Second Extension Track Inboard Frame Plate |
| 71b | Second Extension Track Outboard Frame Plate |
| 72b | Second Extension Track First Receiver Hitch Female Portion First Attachment Flange Top Follower Plate |
| 74b | Second Extension Track Second Receiver Hitch Female Portion First Attachment Flange Top Follower Plate |
| 76b | First Truss Bolt Extension Plate |
| 78b | Second Truss Bolt Extension Plate |
| 80b | First Truss Bolt |
| 82b | Second Truss Bolt |
| 84b | First Truss Bolt Receiver |
| 86b | Second Truss Bolt Receiver |
| 88b | Second Extension Track First Receiver Hitch First Locking Lug |
| 90b | Second Extension Track Second Receiver Hitch First Locking Lug |
| 92b | Second Extension Track First Receiver Hitch Second Locking Lug |
| 94b | Second Extension Track Second Receiver Hitch Second Locking Lug |
| 96b | Second Extension Track Drive Coupler |
| 98b | Second Extension Track Drive Coupler Hub Cover |
| 100b | Second Extension Track Drive Bearing Assembly |
| 102b | Second Extension Track Drive Shaft Extension Axle |
| 104b | (not used) |
| 106b | Second Extension Track Drive Bearing Assembly Bearing Race and Bearing |
| 108b | Second Extension Track Continuous Track |
| 110b | Second Extension Track Drive Sprocket |
| 112b | Second Extension Track Drive Shaft Extension Axle End Block |
| 114b | Second Extension Track Drive Shaft Extension Axle Receiver |
| 116b | Second Extension Track Drive Coupler Torque Plate |
| 118b | Second Extension Track Drive Coupler Hub Cover Inner Connection Flange |
| 120b | Second Extension Track Drive Coupler Hub Cover Spacer/Sidewall |
| 122b | Second Extension Track Drive Coupler Hub Cover Outer Connection Flange |
| 124b | (not used) |
| 126b | Second Extension Track Drive Coupler Torque Plate Bolts |
| 128b | Second Extension Track First Receiver Hitch Male Portion Connection Plate |
| 130b | Second Extension Track Second Receiver Hitch Male Portion Connection Plate |
| 132b | Second Extension Track First Receiver Hitch Male Portion Connection Plate Top Follower Plate |
| 134b | Second Extension Track Second Receiver Hitch Male Portion Connection Plate Top Follower Plate |
| 136b | Second Extension Track Horizontal Stiffener |
| 138b | Second Extension Track Vertical Softener |
| 140b | D-ring |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

First and second (in the embodiment, port and starboard) extension track assemblies 12a and 12b are mirror images of each other. First extension track assembly 12a, in the embodiment corresponding to the port-side of the equipment, is shown and described in detail, labelled "a". It will be understood that second extension track assembly 12b includes corresponding elements, labelled "b". The existing installed port and starboard tracks on the equipment used in normal operation are referred to below as the "original tracks" or "equipment lateral tracks" for simplicity, although they might not be original to the equipment.

The first extension track assembly 12a (corresponding to the starboard side) is described in detail, with the corresponding second extension track assembly 12b components shown in parenthesis.

Figure 2:
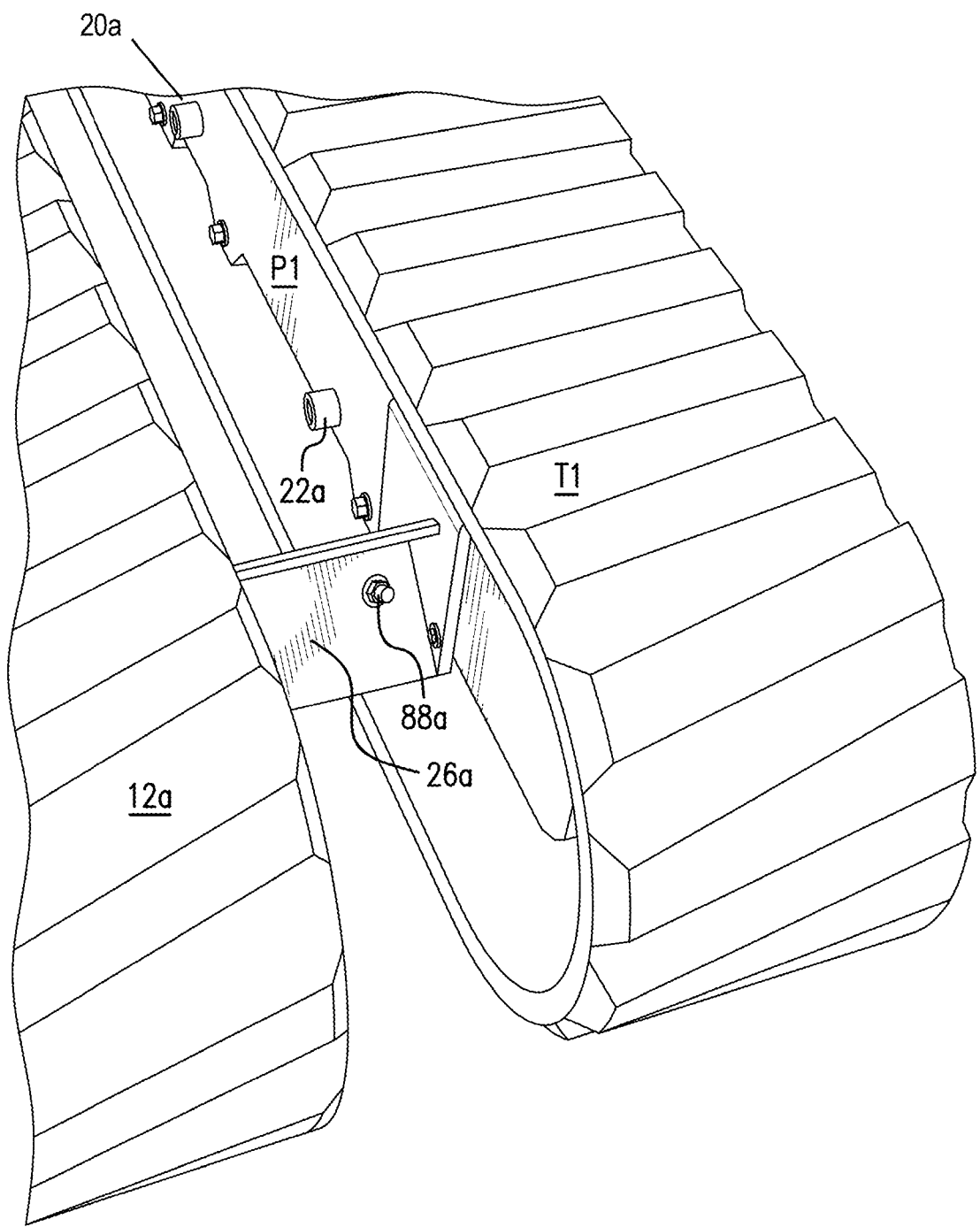
FIG. 2 shows a partial port side aft view of a first embodiment.
Figure 3:
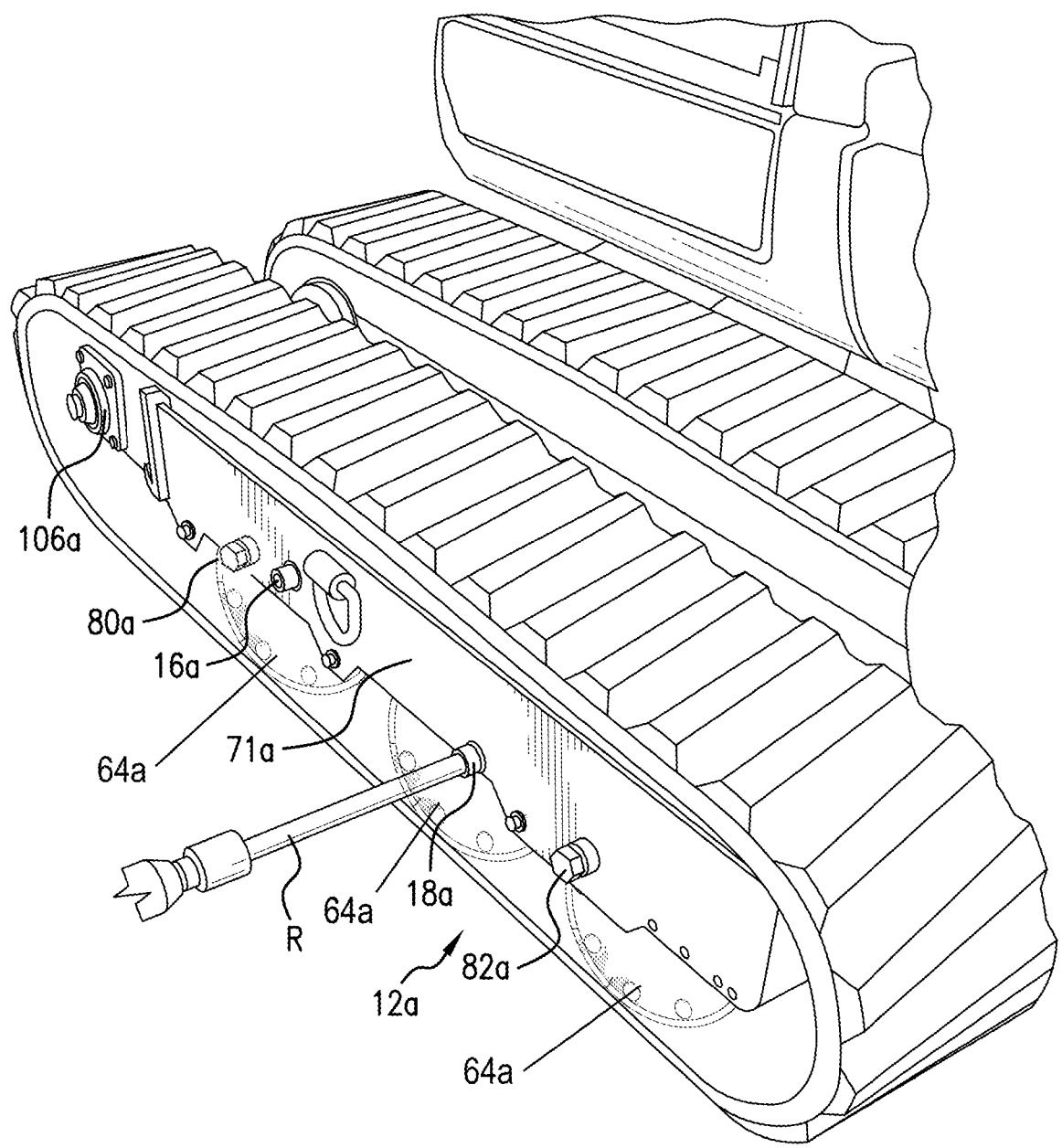
FIG. 3 shows a port side view of a first embodiment.
Figure 4:
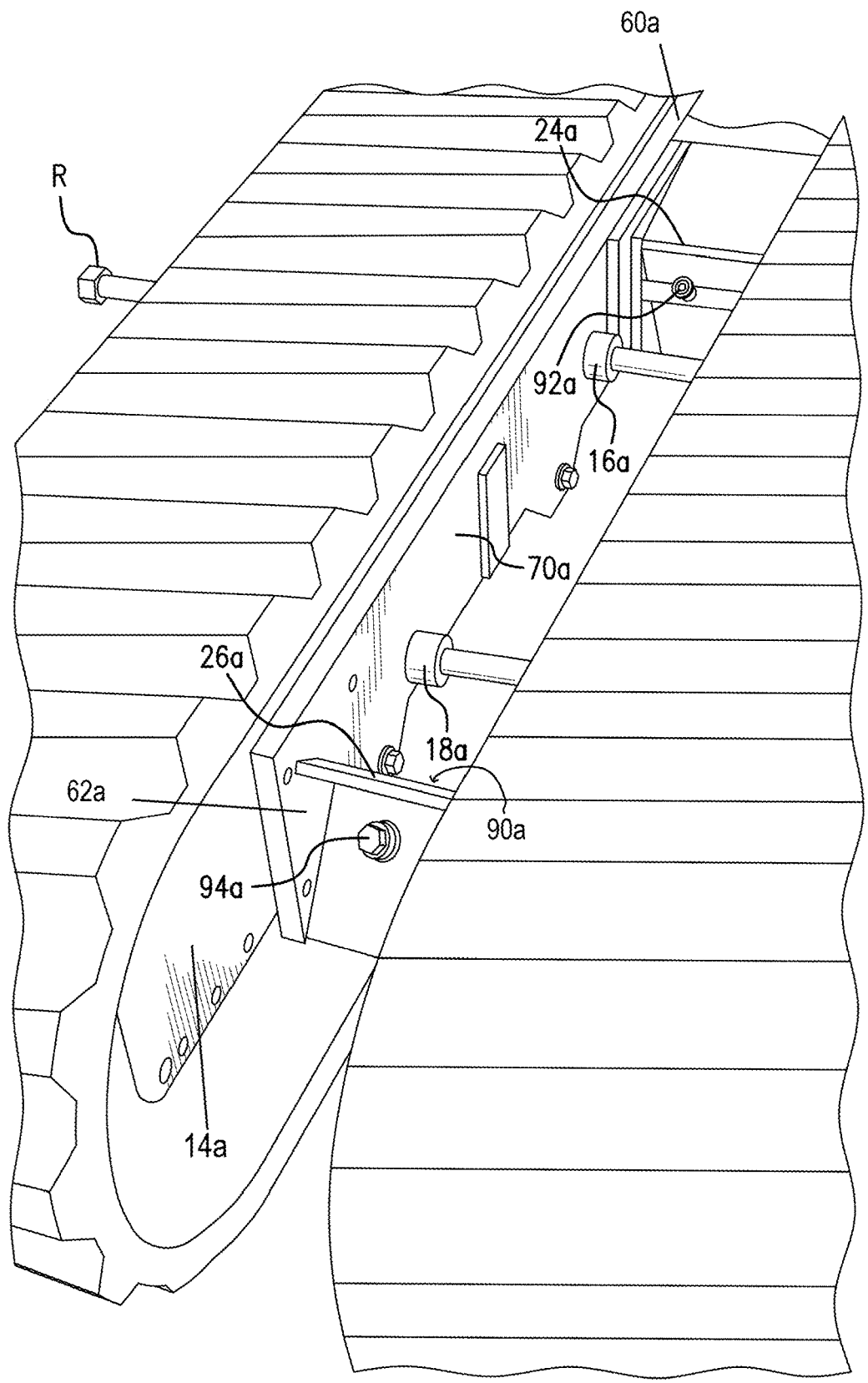
FIG. 4 shows a port side aft view of a first embodiment.
Figure 5:
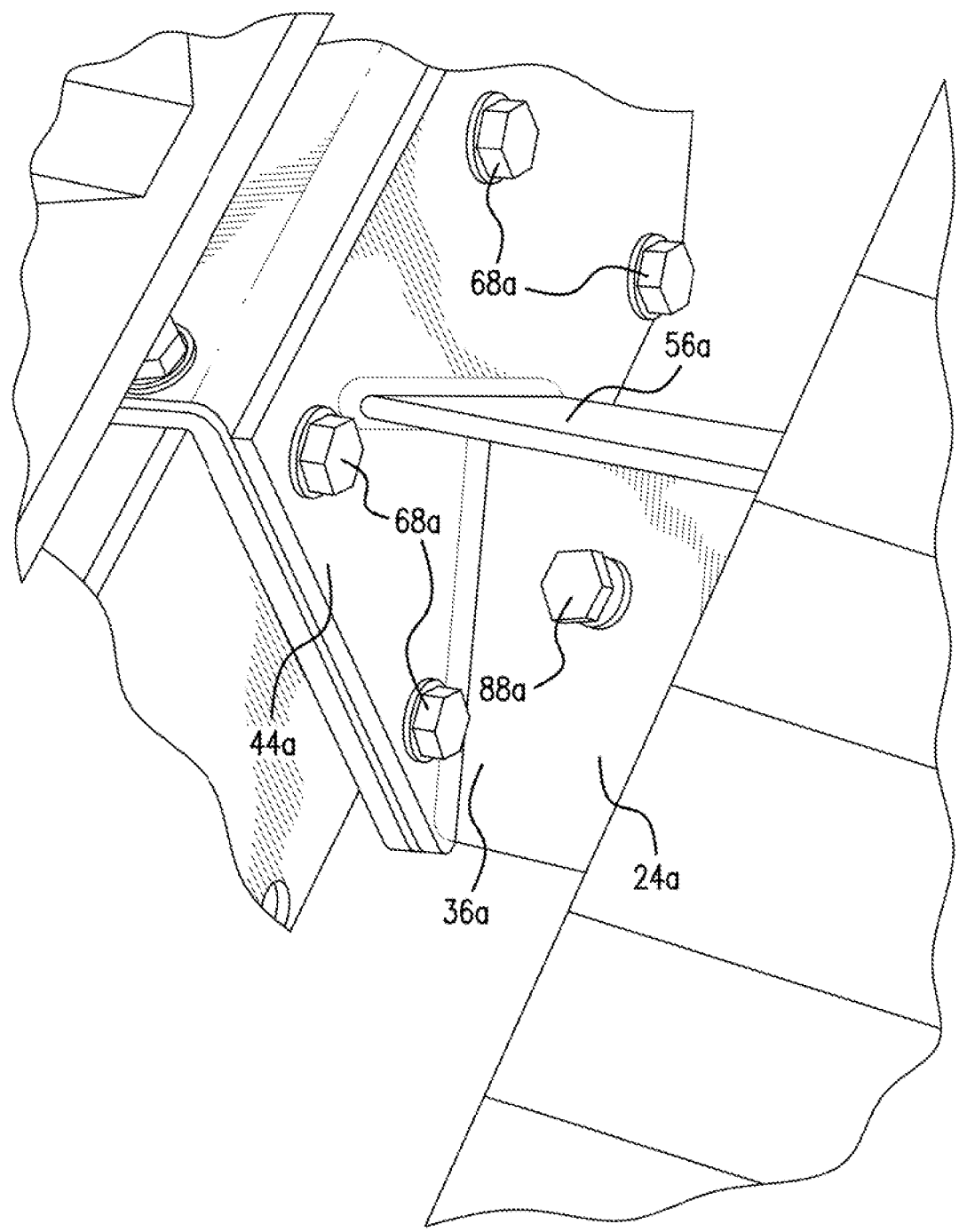
FIG. 5 shows a close-up view of a receiver hitch of a first embodiment.
Figure 6:
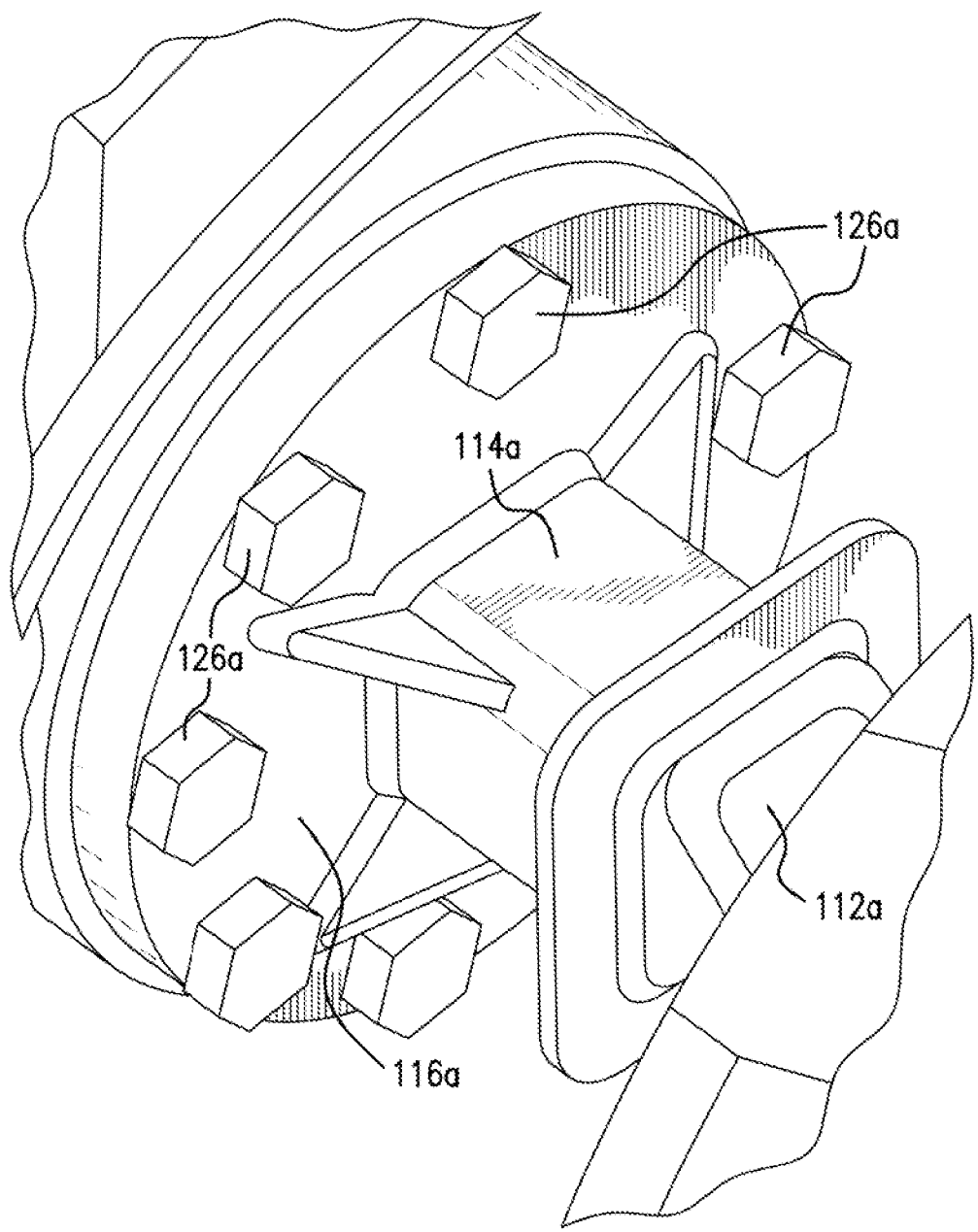
FIG. 6 shows a close-up view of a drive coupler of a first embodiment.
Figure 7:
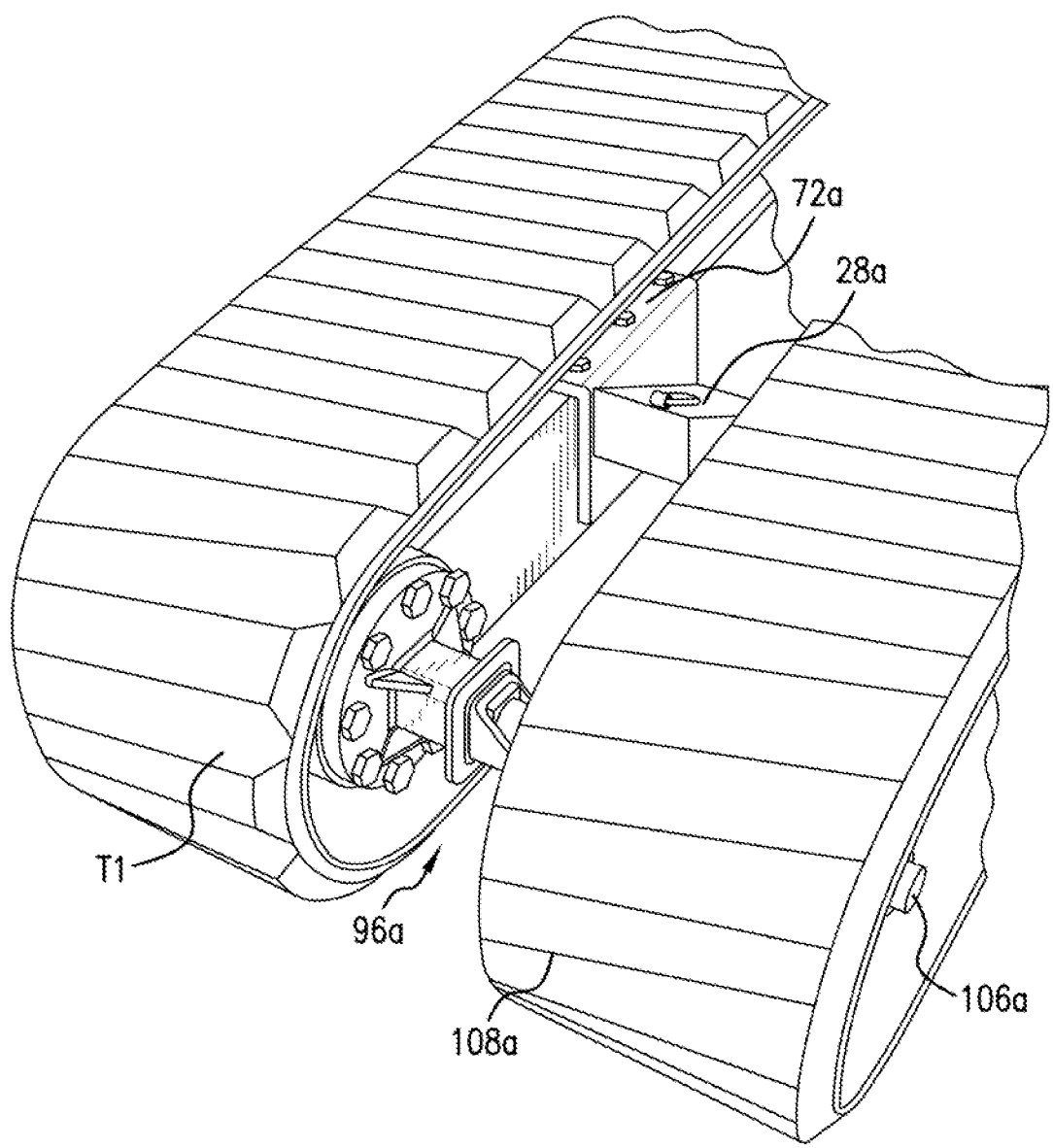
FIG. 7 shows a partial front port side view of a first embodiment, including a drive coupler.
Figure 8:
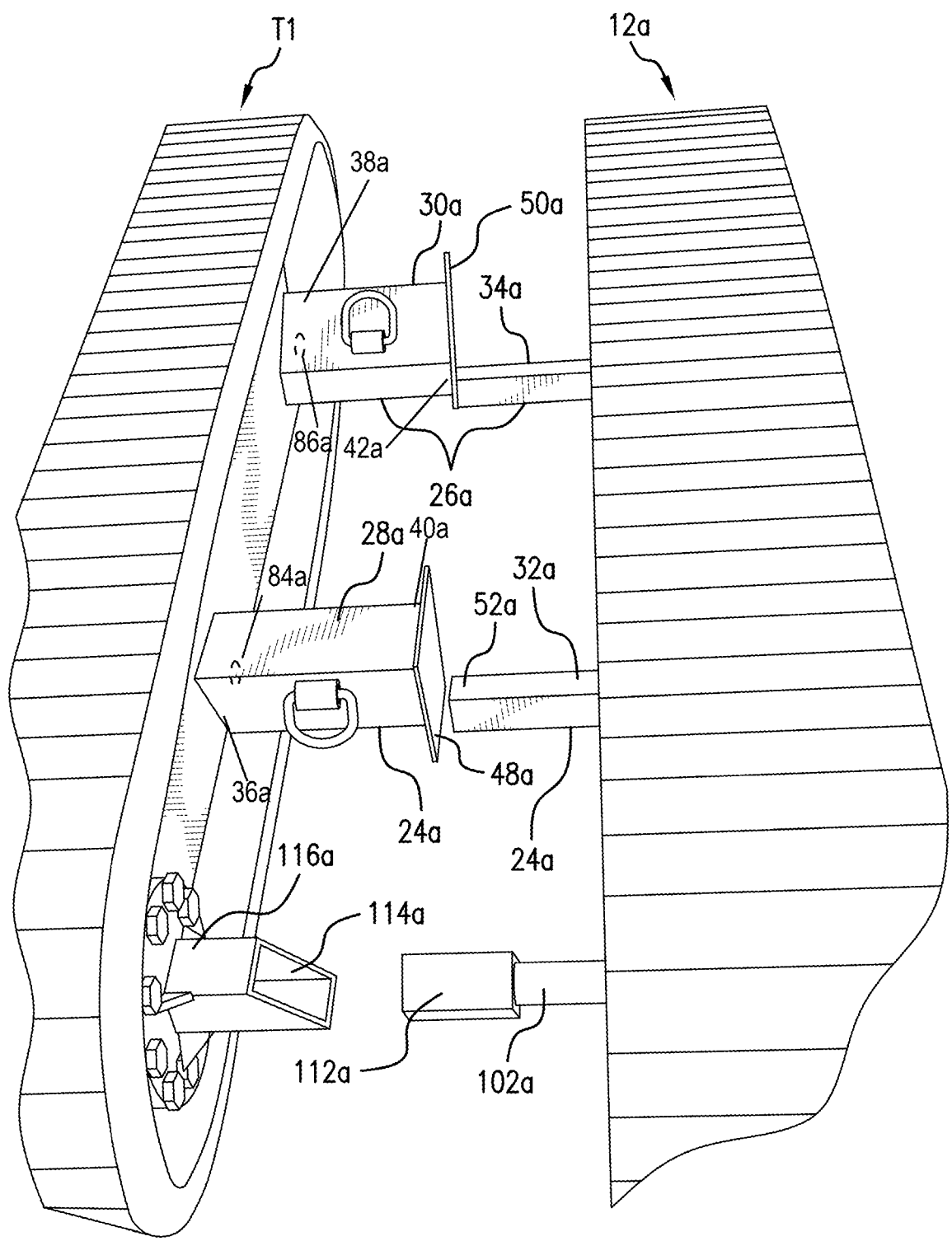
FIG. 8 shows a port extension track assembly of a first embodiment, disconnected from the equipment.
Figure 9:
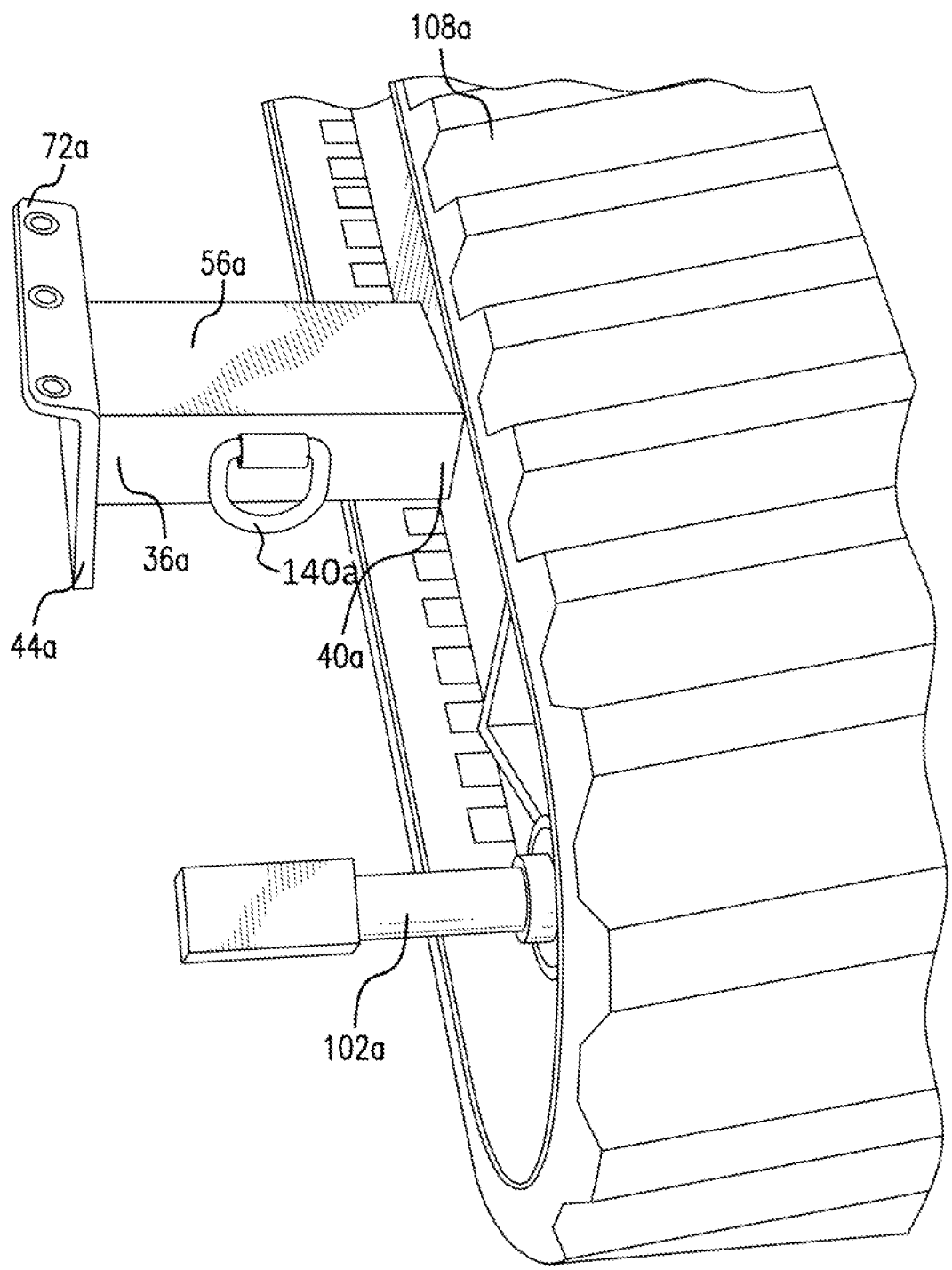
FIG. 9 shows a front inside side view of a port extension track assembly.
Figure 10:
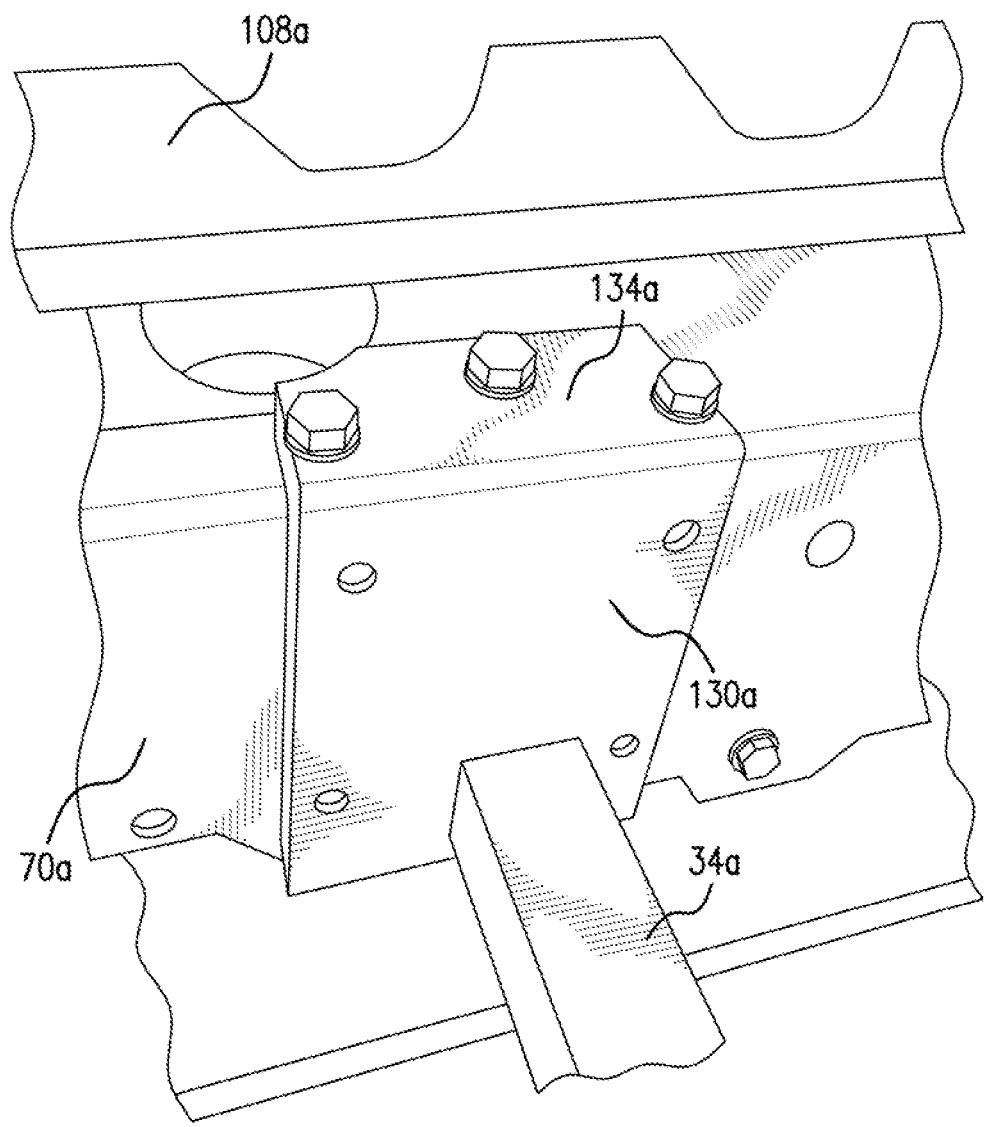
FIG. 10 shows a close-up view of a male portion of a receiver hitch.
Figure 11:
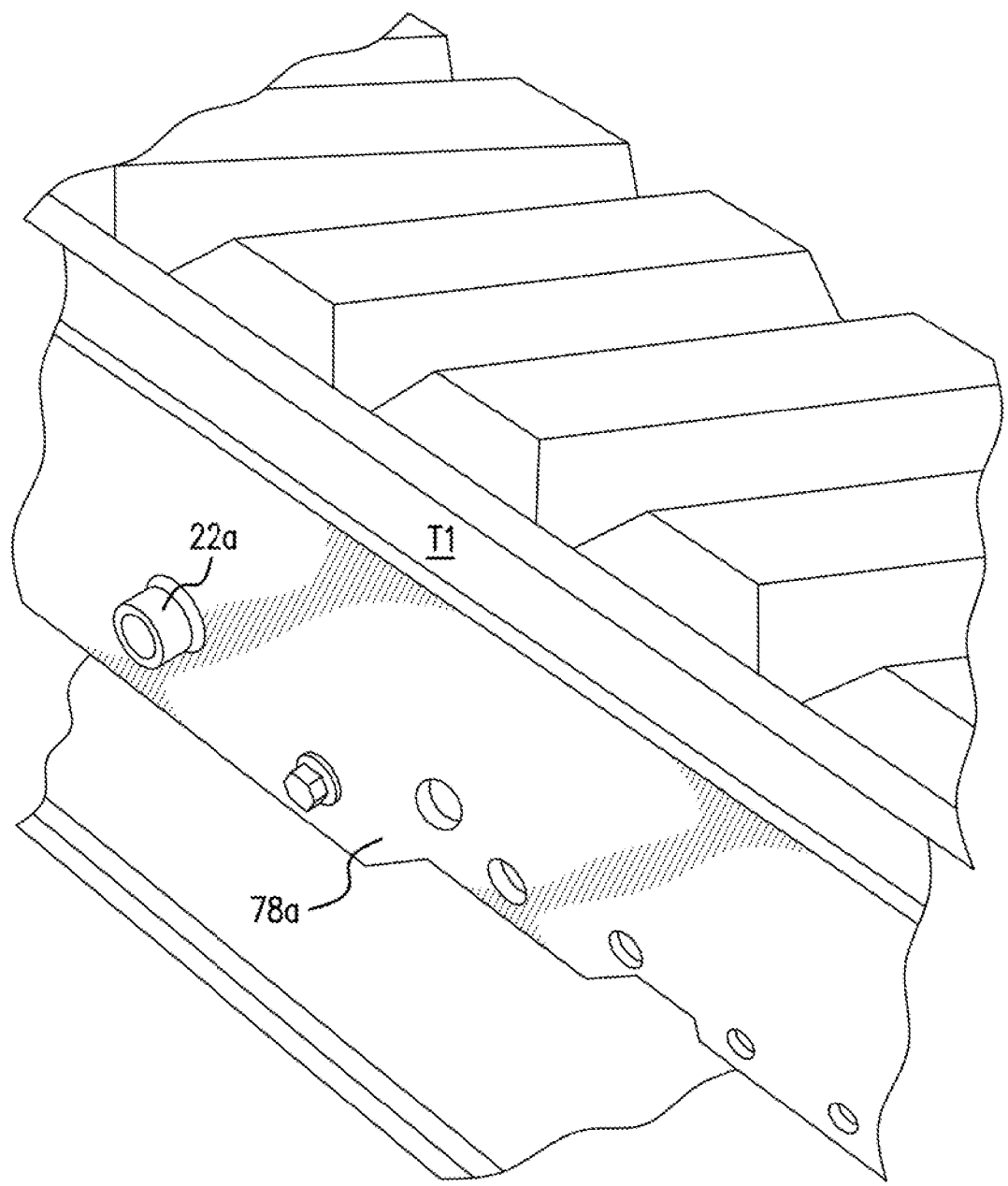
FIG. 11 shows an track extension plate of a first embodiment.
Figure 12:
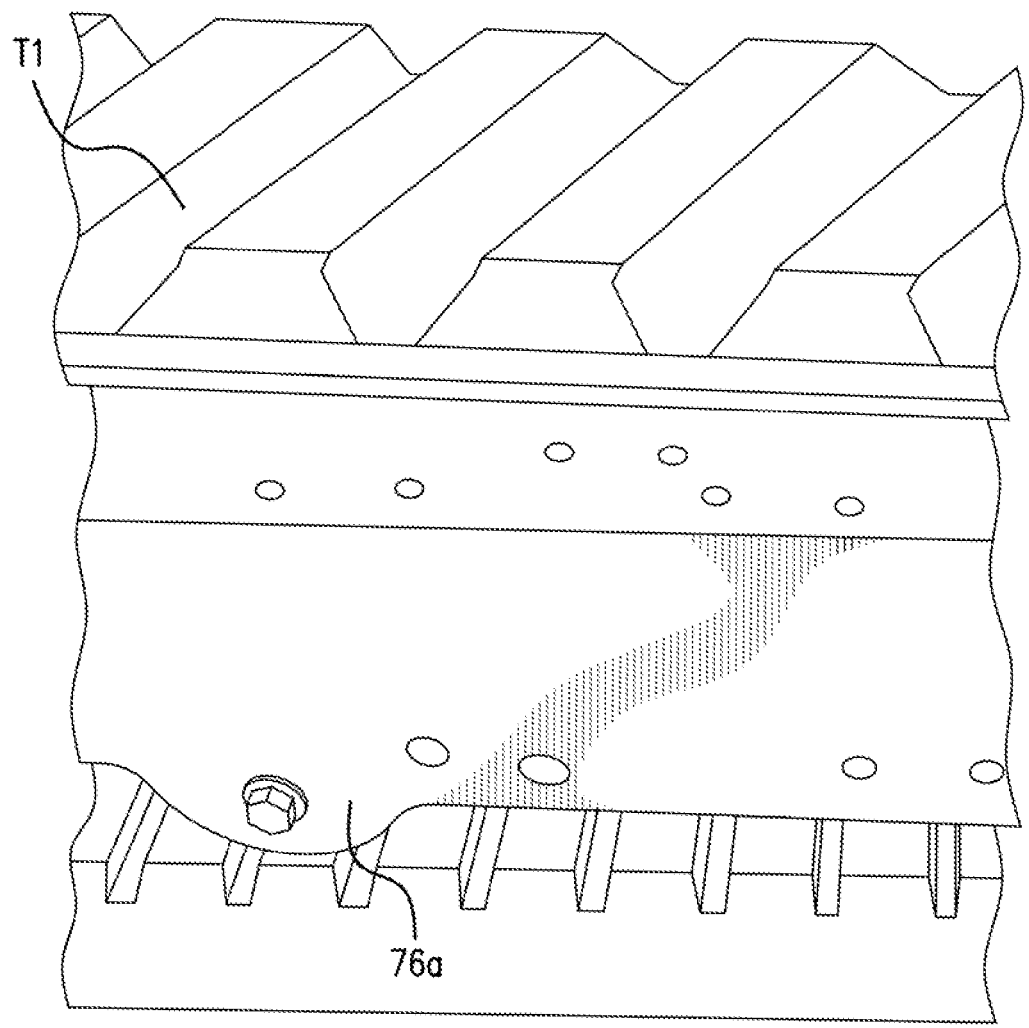
FIG. 12 shows an track extension plate of a first embodiment.
Figure 13:
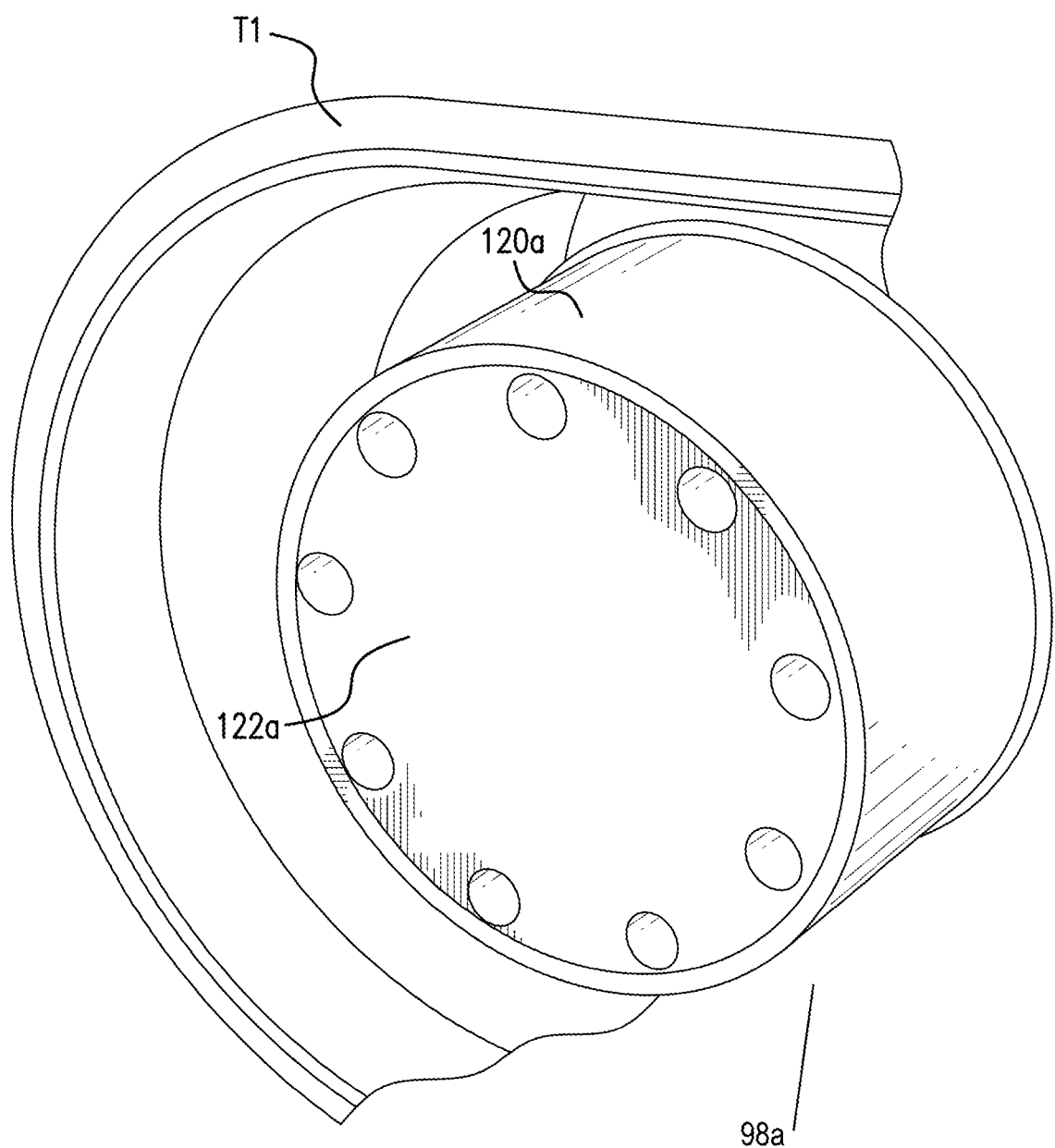
FIG. 13 shows a close-up view of a drive coupler hub cover of a first embodiment.
Figure 14:
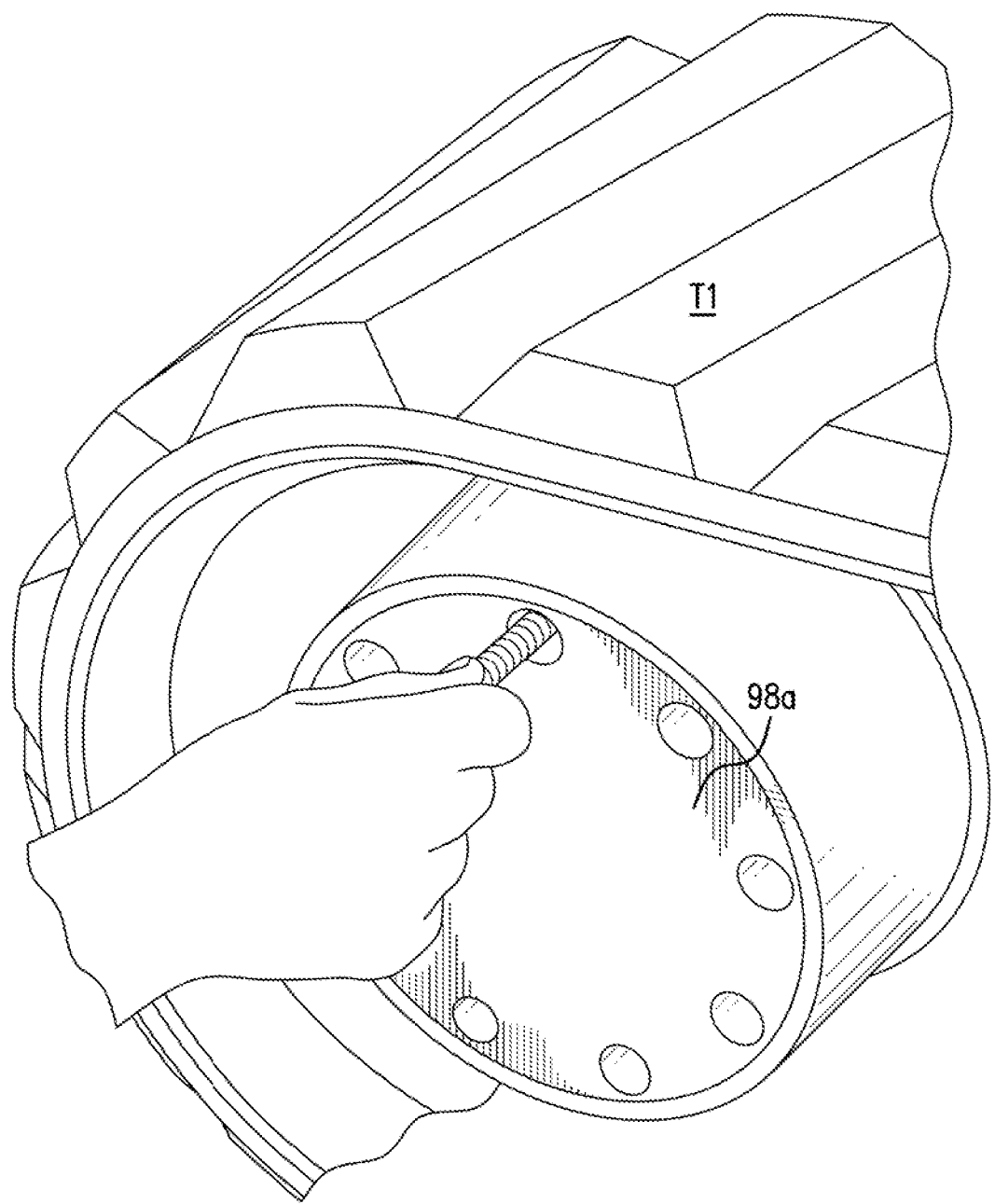
FIG. 14 shows a close-up view of a drive coupler hub cover of a first embodiment being disassembled.
Figure 15:
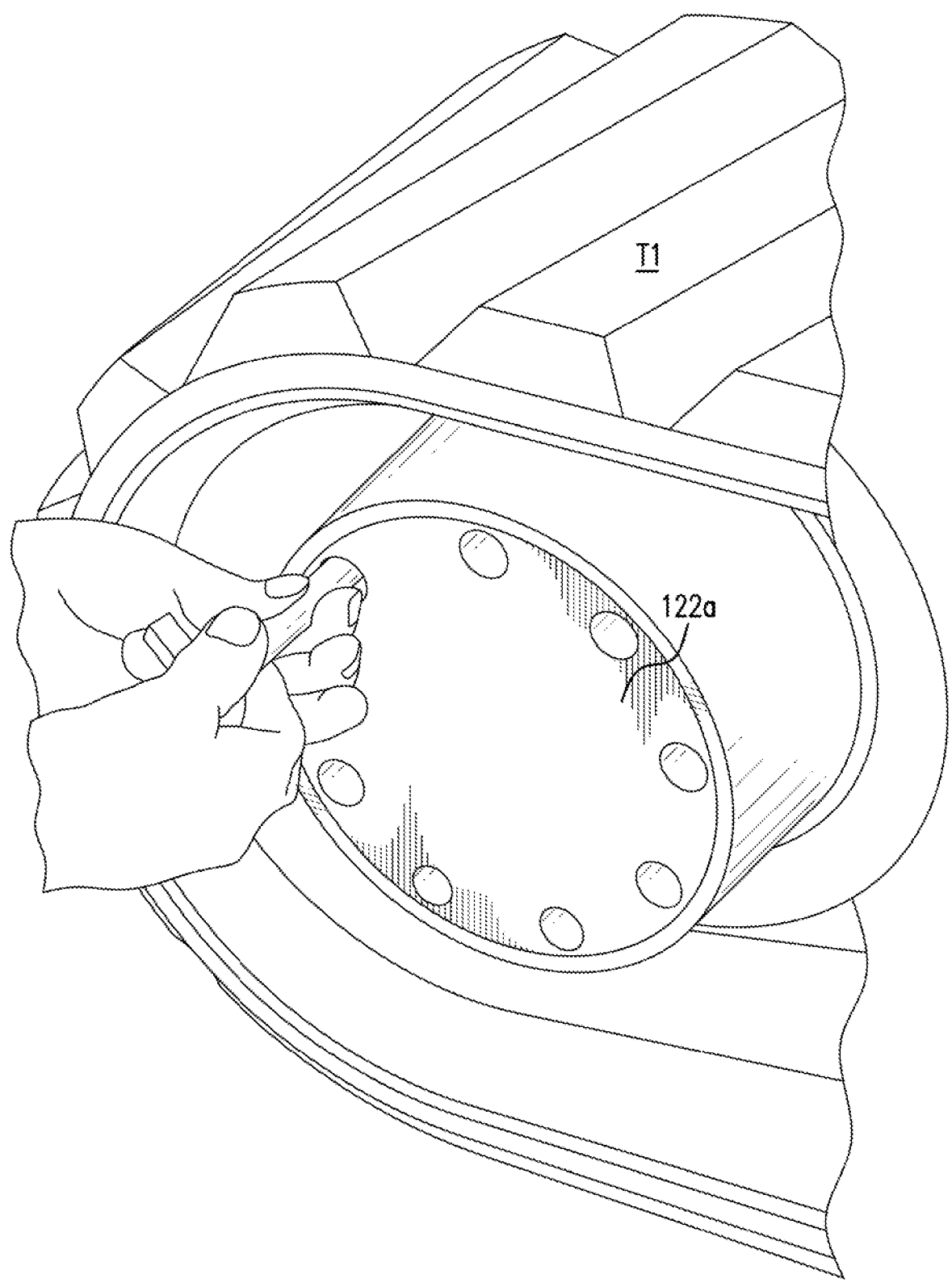
FIG. 15 shows a close-up view of a drive coupler hub cover of a first embodiment being disassembled.
Figure 16:
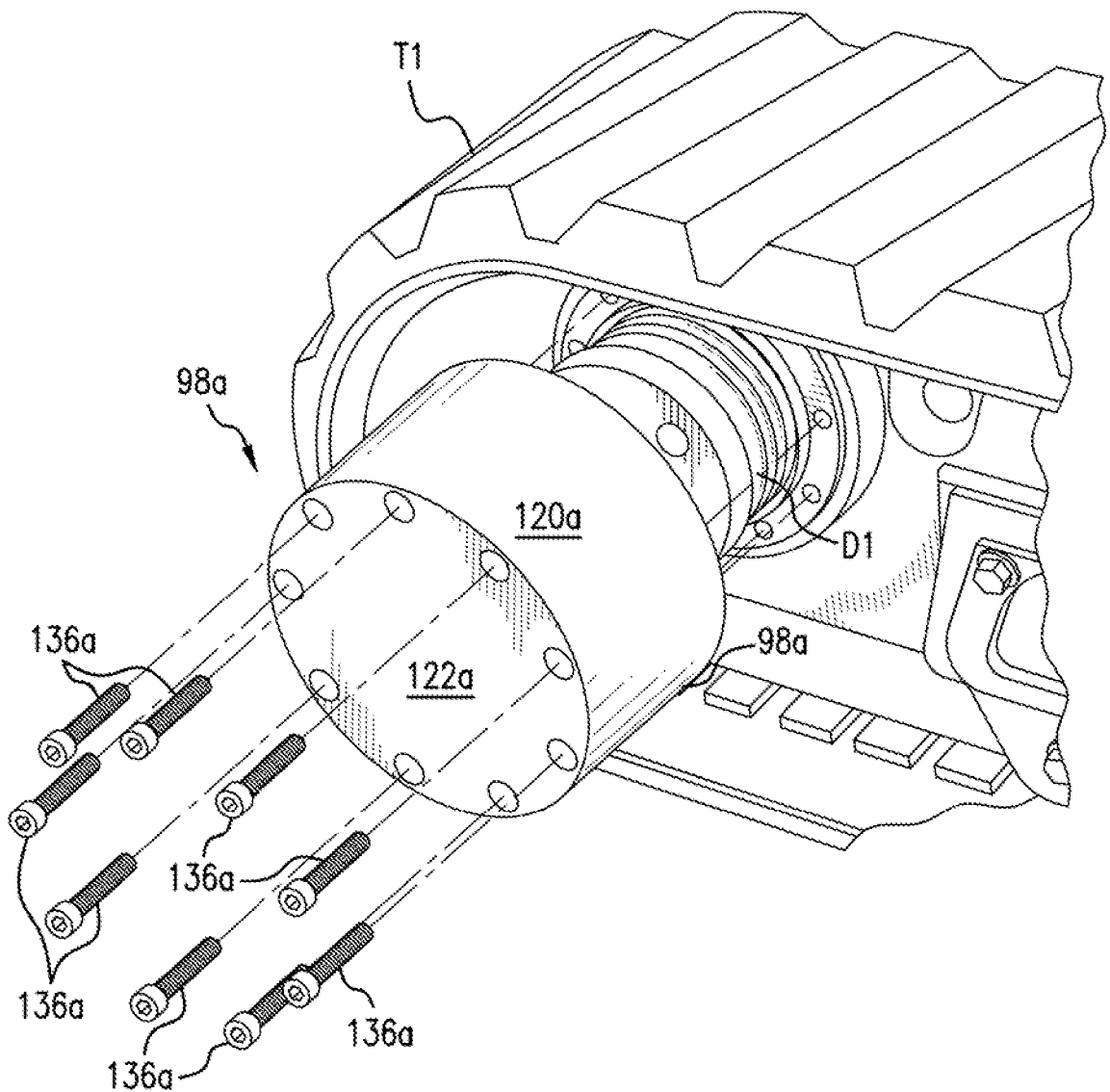
FIG. 16 shows a partially-exploded view of a drive coupler hub cover of a first embodiment.
Figure 17:
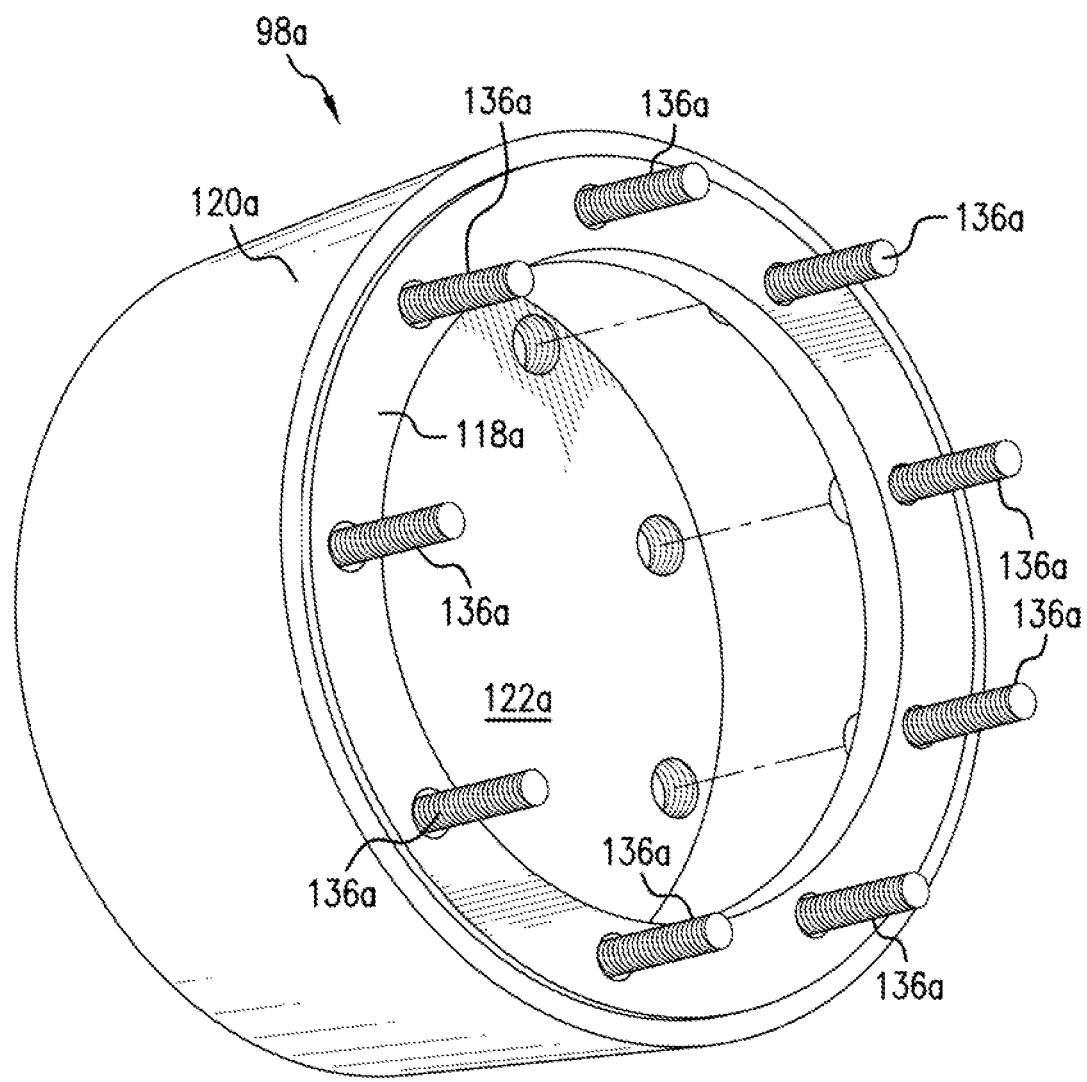
FIG. 17 shows an interior view of a drive coupler hub cover with connector bolts.
Figure 18:
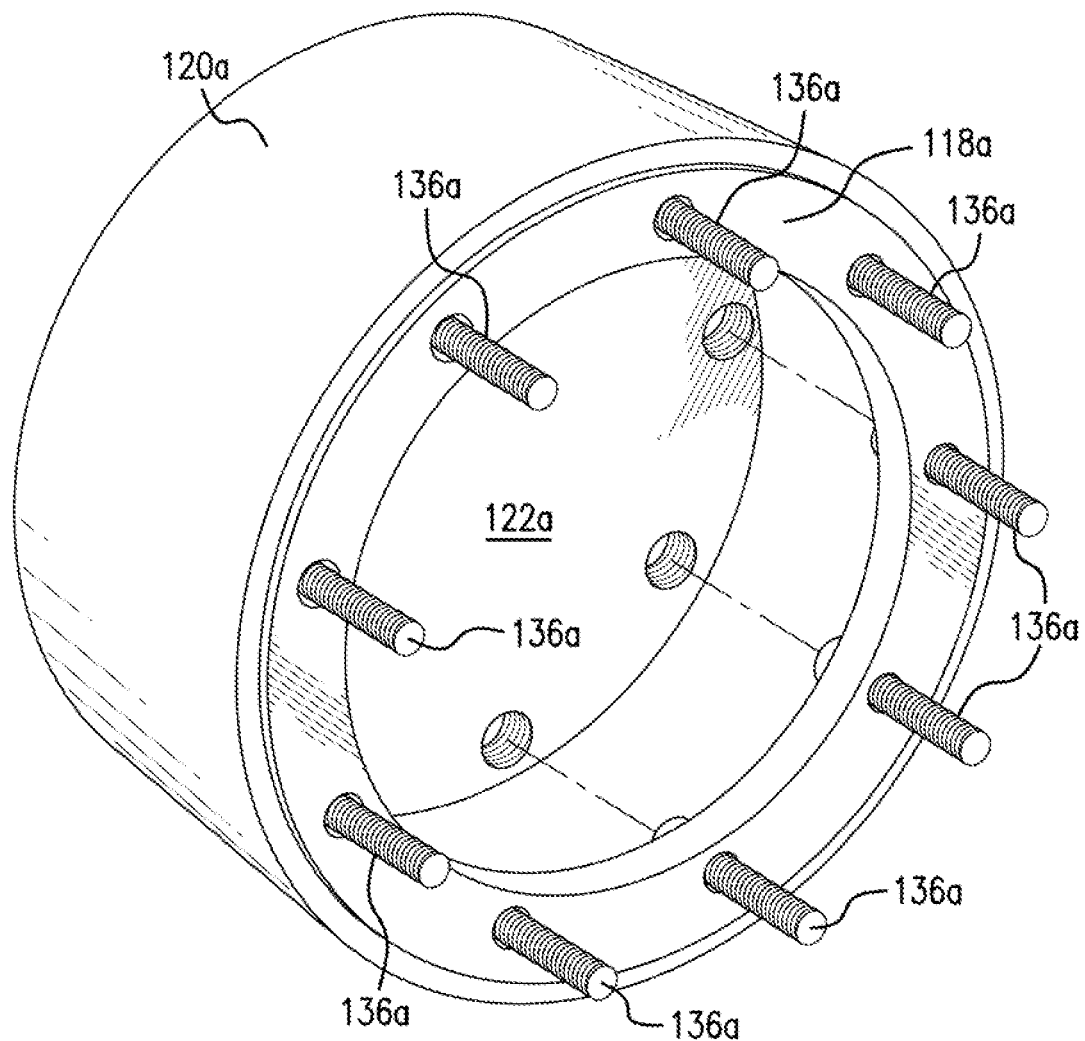
FIG. 18 shows an interior view of a drive coupler hub cover with connector bolts.
Figure 19:
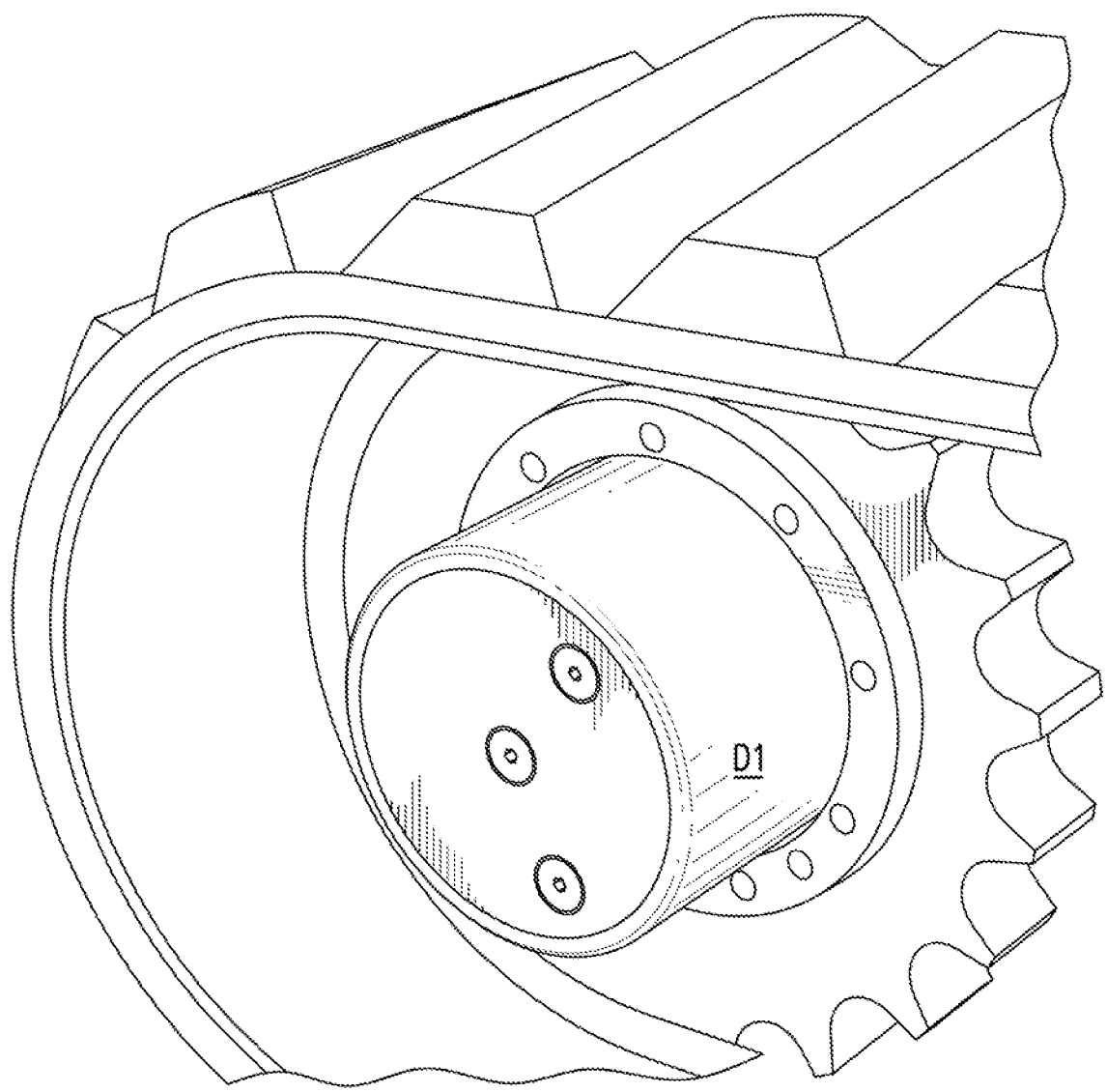
FIG. 19 shows a close-up view of an original track drive sprocket assembly.
Figure 20:
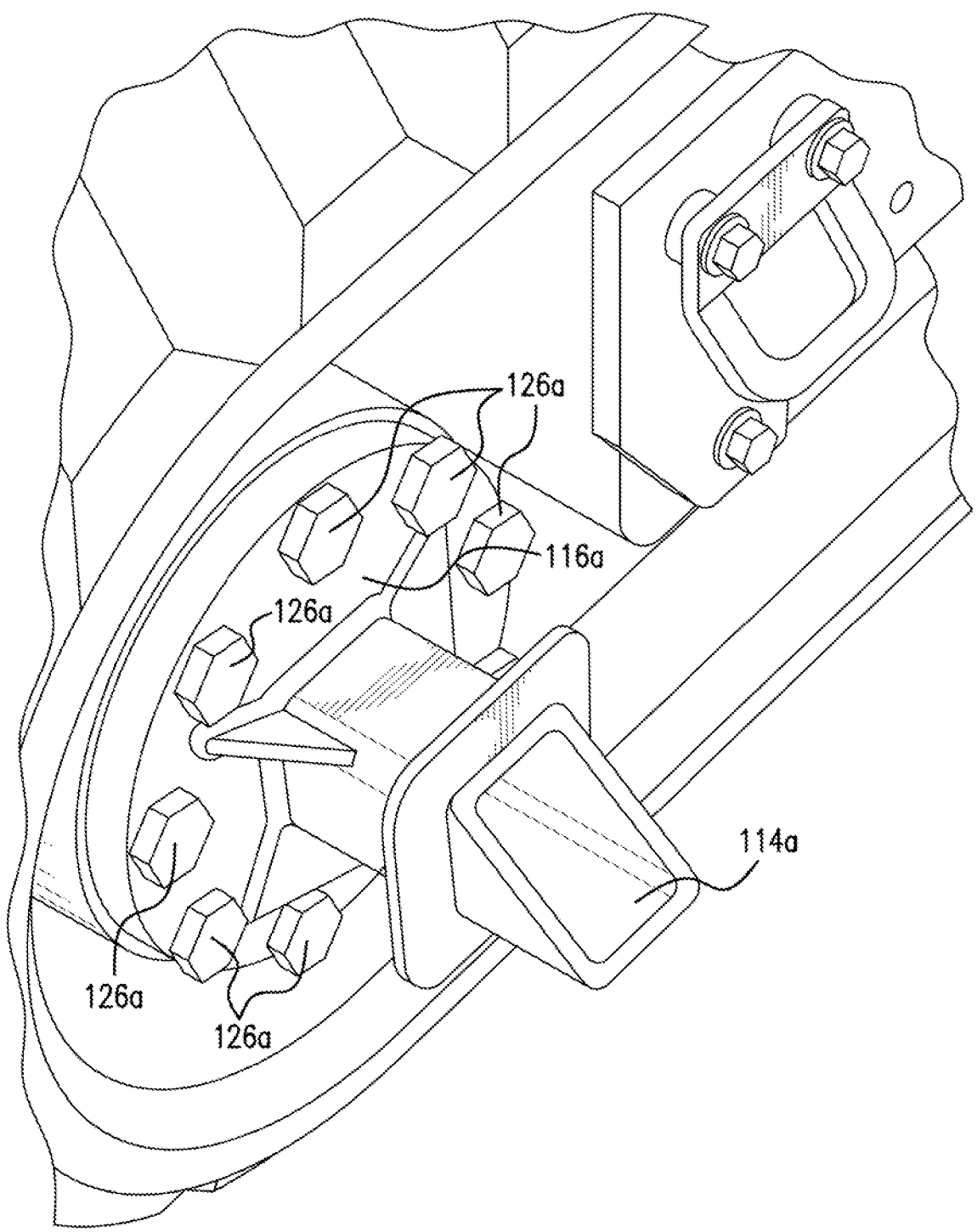
FIG. 20 shows a view of the drive coupler torque plate and extension axle receiver of a first embodiment.
Figure 21:
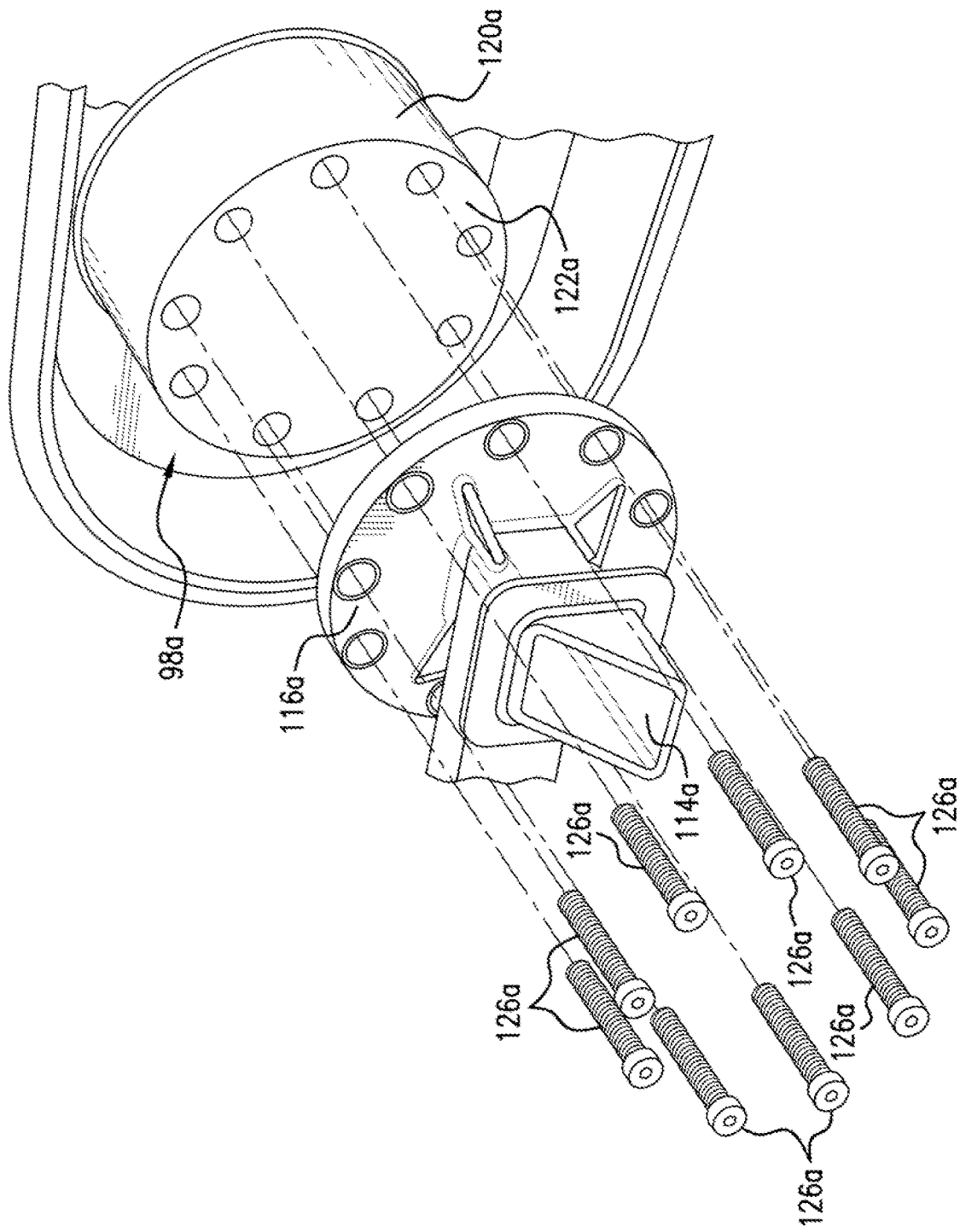
FIG. 21 shows a partially exploded view of a drive coupler torque plate assembly of a first embodiment.
Figure 22:
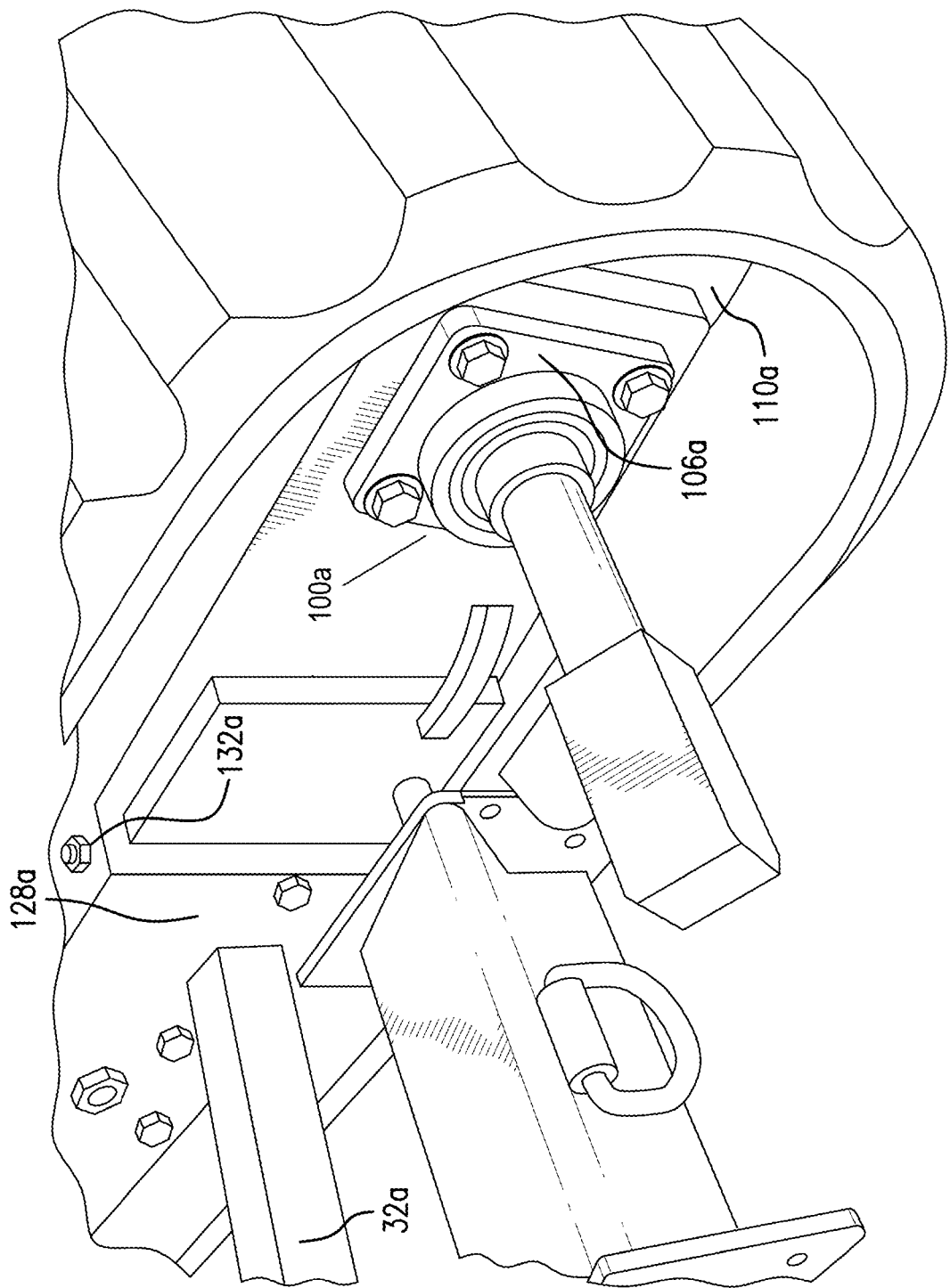
FIG. 22 shows a drive bearing assembly of an extension track assembly of a first embodiment.
Figure 23:
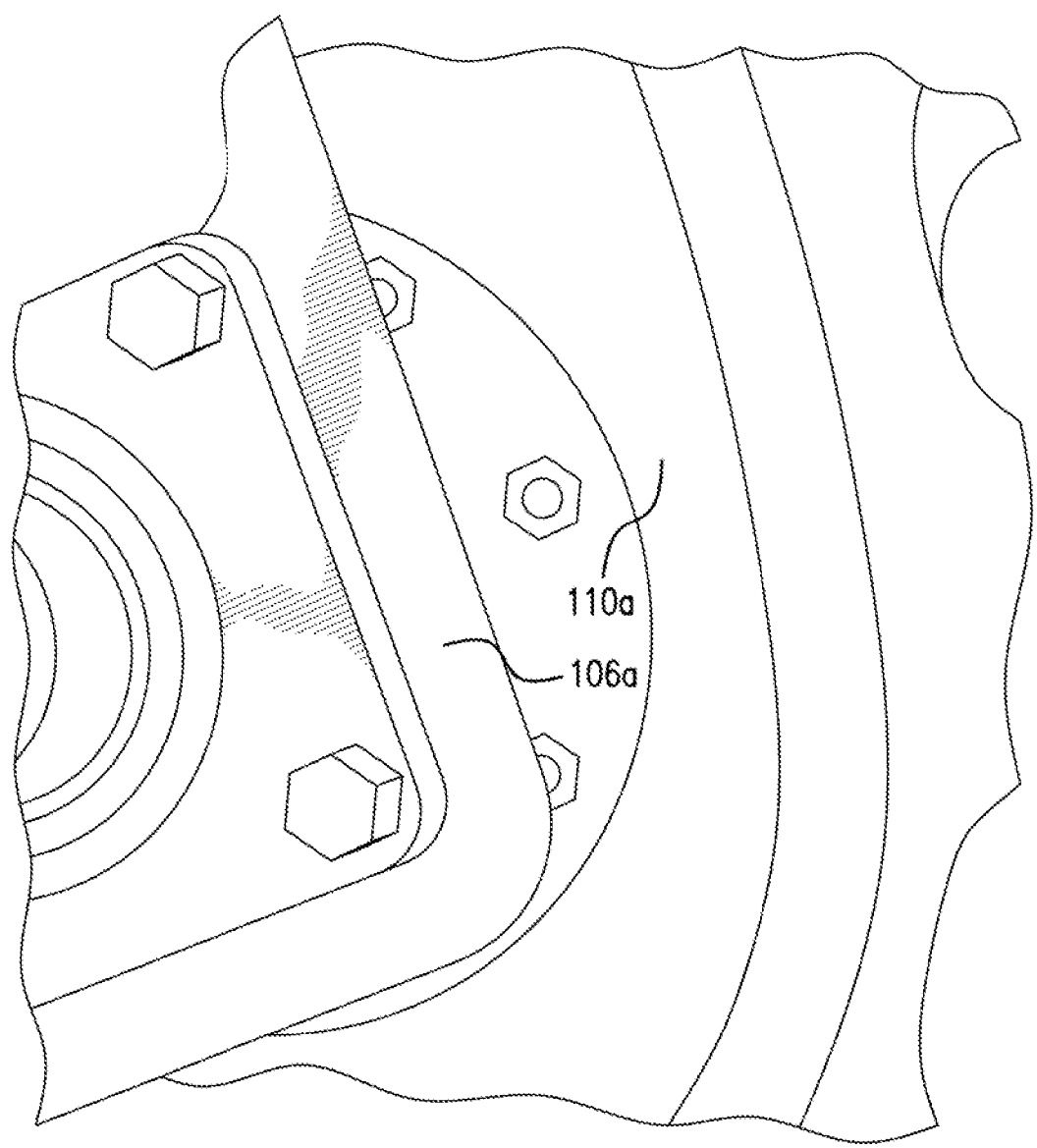
FIG. 23 shows a drive bearing assembly of an extension track assembly of a first embodiment.
Figure 24:
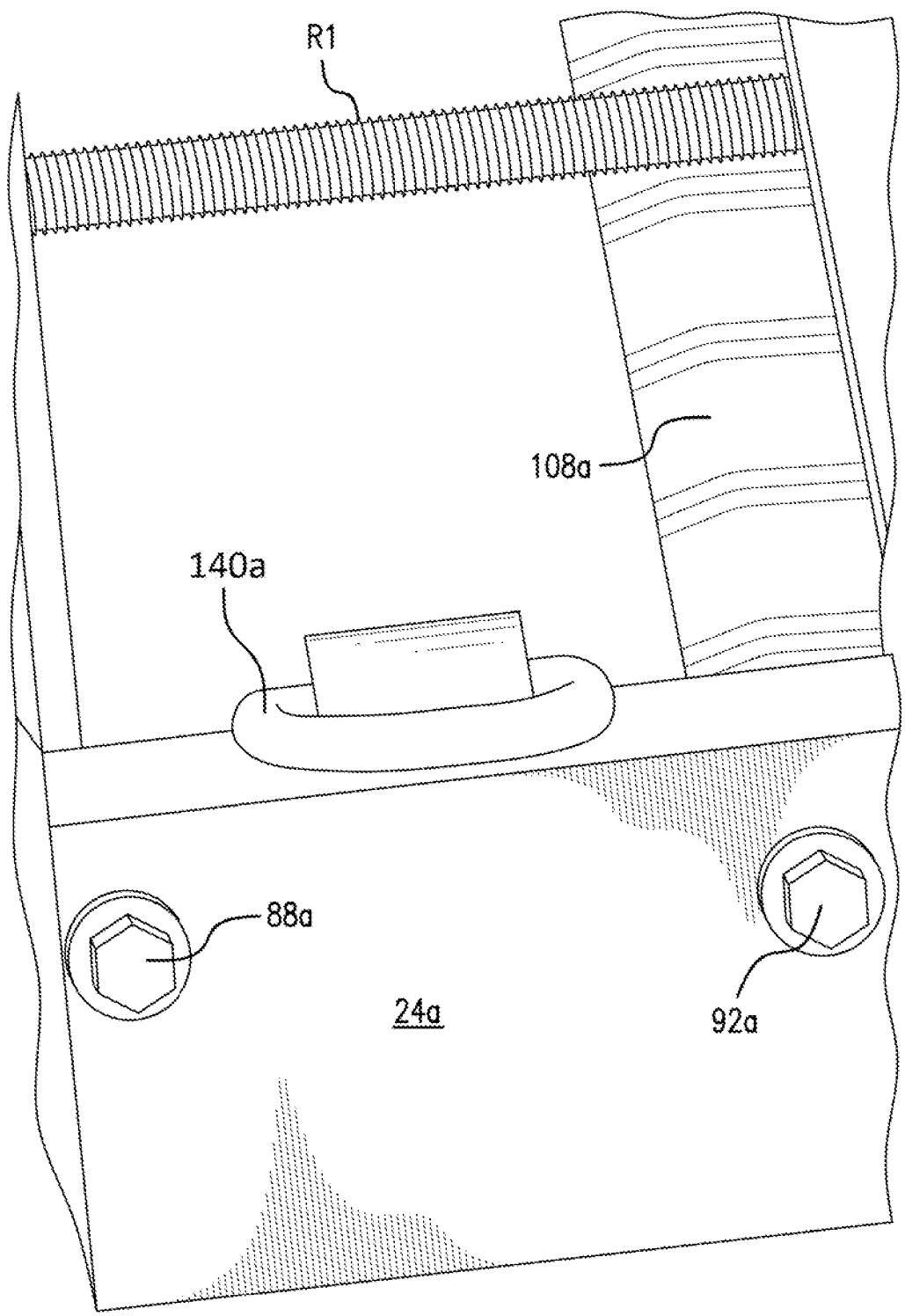
FIG. 24 shows an overhead view of a receiver hitch and D-ring of a first embodiment, with a pusher/disassembly bolt visible during disassembly of a first embodiment.
Figure 25:
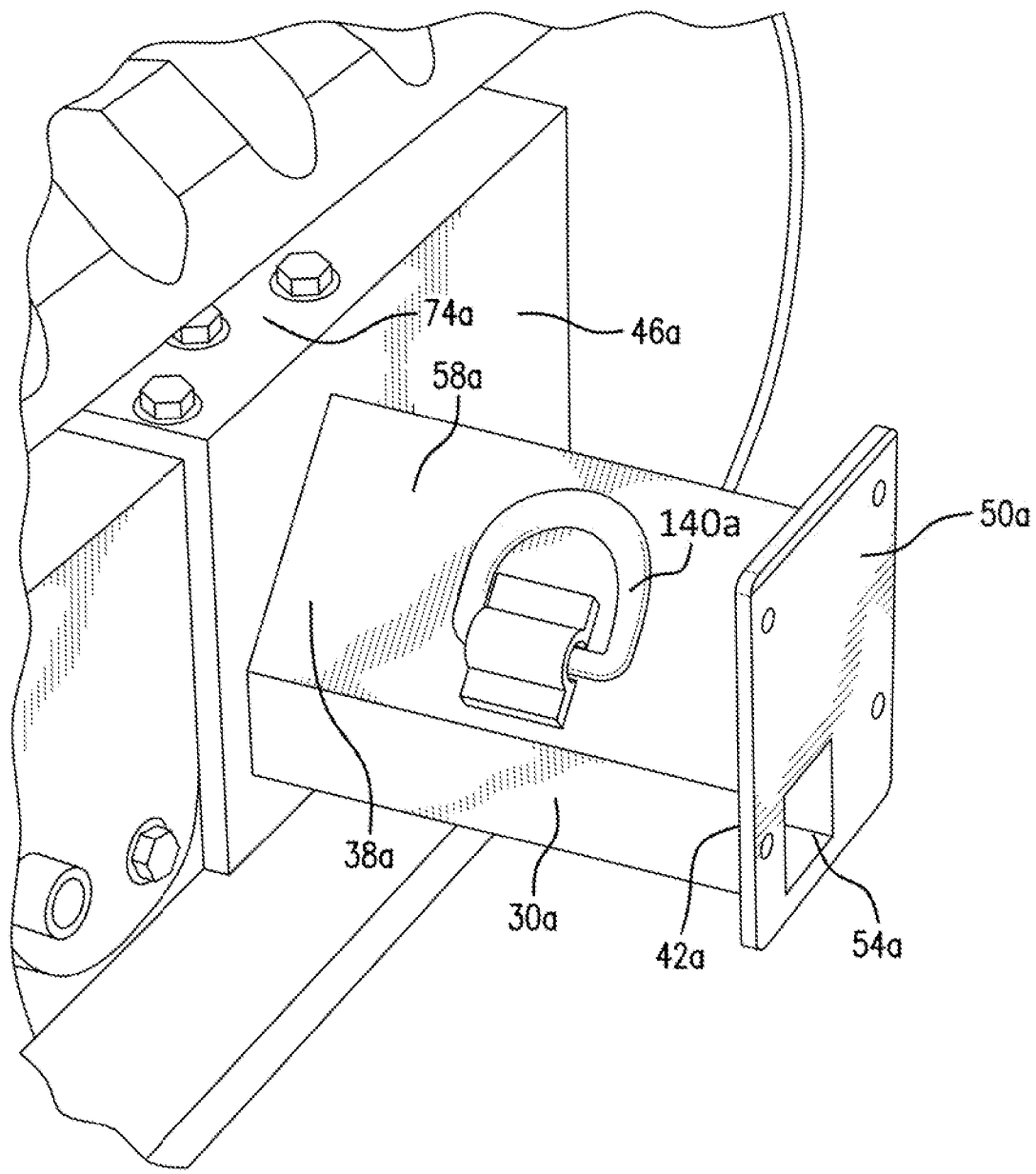
FIG. 25 shows a close-up view of a female portion of a port side aft receiver hitch of a partially disassembled track extension system of a first embodiment.
Figure 26:
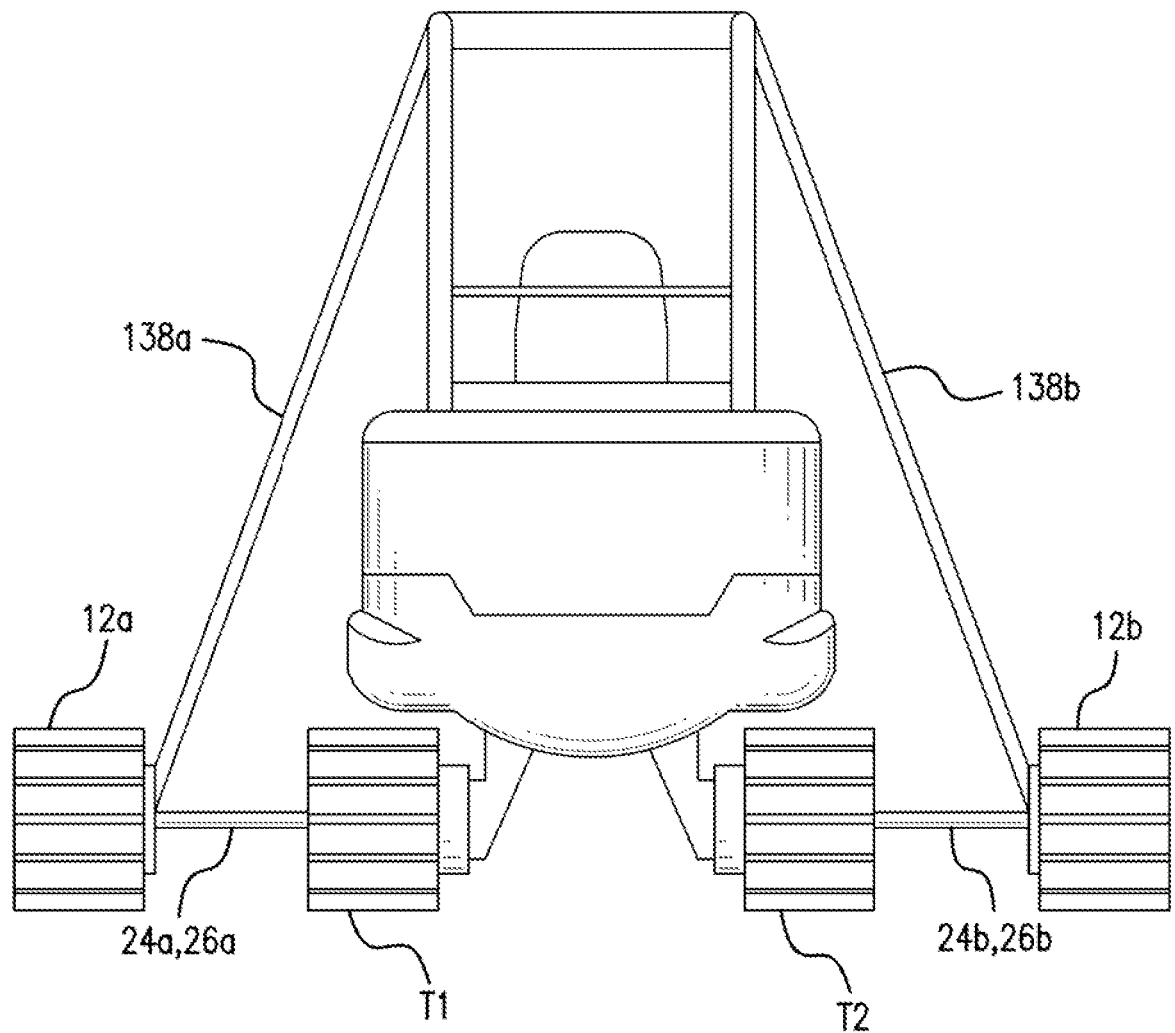
FIG. 26 shows a schematic view of a track extension system with horizontal stiffeners of a first embodiment.
Figure 27:
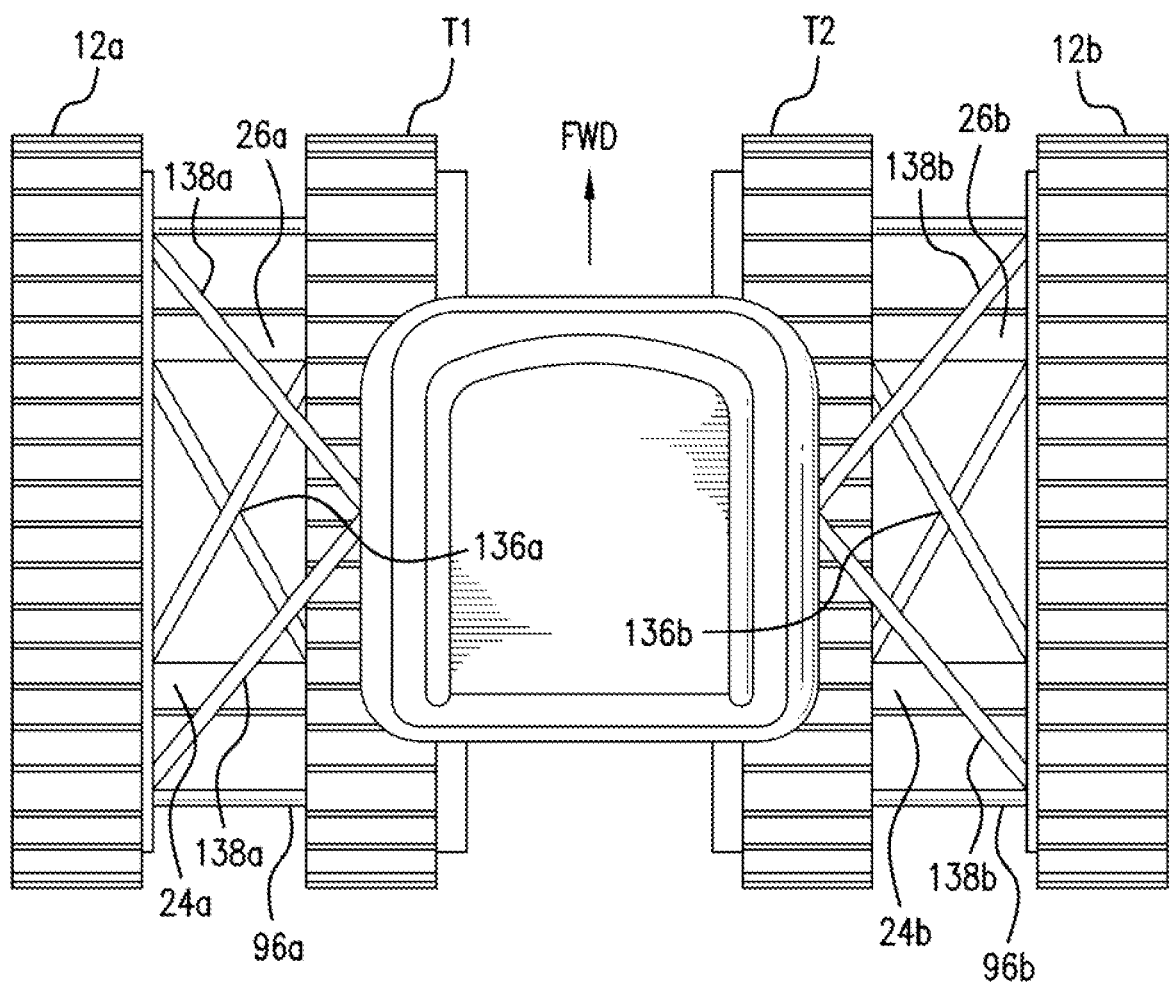
FIG. 27 a schematic view of a track extension system with vertical stiffeners of a first embodiment.

As shown in FIGS. 1-27, a first embodiment of a removable universal lateral track extension system 10 is provided, including first and second extension track assemblies 12a and 12b, which are identical mirror-images of each other mountable on opposed sides of a tracked equipment outboard of the original lateral tracks T1 and T2. Each extension track assembly 12a(b) includes a frame plate 70a(b), a plurality of track rollers 64a(b), a drive coupler assembly 96a(b), a continuous track 108a(b) and first and second receiving hitches 24a(b) and 26a(b), respectively.

The extension track frame 14a(b) includes a frame plate 70a(b) attached rigidly to track frame 14a(b) to provide stiffness and connectivity. In the embodiment, frame plate 70a(b) extends from a first (forward) portion 60a(b) to a second (aft) portion 62a(b), but the forward and aft portions may comprise separate portions. In the embodiment, frame plate 70a(b) is welded to be integral with extension track frame 14a(b), but may connected by other means, or formed integrally as part of extension track frame 14a(b). Extension track frame plate 70a(b) is disposed on the inboard side of the extension track frame 14a(b). First and second threaded alignment a(b) channels 16a(b), 18a(b) extend through extension track frame outboard plate 71a(b) and 70a(b) to receive threaded pusher rod R, which assists in aligning and separating/mating the extension track assembly 12a(b) to original track assembly T1, including being able to use common motorized rotary tools for assembly and disassembly. In the embodiment, first and second alignment cups 20a(b), 22a(b) corresponding to first and second threaded alignment channels 16a(b), 18a(b) are attached to the original track assembly T1 frame plate, each cup 20a(b), 22a(b) disposed to receive the end of a threaded pusher rod extending through the respective first and second alignment channels 16a(b), 18a(b). This allows the operator to jack the extension track assembly 12a(b) into position and maintain alignment using standard rotary tools/drivers.

In the embodiment, first and second receiver hitches 24a(b), 26a(b) each include a female portion 28a(b), 30a(b) and a male portion 32a(b), 34a(b). Each female portion 28a(b), includes a receiving channel extending from a first end 36a(b), 38a(b) to a second end 42a(b), and first and second connection flanges 44a(b), 46a(b) and 48a(b), 50a(b), respectively. Each of second connection flanges, 48a(b), 50a(b) includes a receiving aperture 52a(b), 54a(b) having a cross section corresponding to the respective receiver hitch male portions 32a(b), 34a(b). Each male portion 32a(b), 34a(b) is coupled to the extension track frame inboard plate 70a(b) by a flange plate 128a(b), 130a(b) and corresponding top follower plate 132a(b), 134a(b). In the embodiment, female portions 28a(b), 30a(b) are roughly triangular in cross section, oriented apex down. Each female portion 28a(b), 30a(b) includes a top extension flange plate 56a(b), 58a(b) extending from their respective first ends 36a(b), 38a(b) to their respective second ends 40a(b), 42a(b), the top flange plates 56a(b), 58a(b) being wider than the triangular cross section to increase strength against bending and out-of-alignment torque forces. The cross section, flange and bolt arrangements are configured to not interfere with the suspension components of original track T1 (T2), while providing adequate strength to the connection members. In the embodiment, male portions 32a(b), 34a(b) are square-cross-section rods, the non-circular cross-sections assisting in ensuring proper alignment when connecting extension track 12a(b) to original track T1 (T2). Additionally, the engagement of the male portions 32a(b), 34a(b) within the female portions 28a(b), 30a(b) acts as a torque arm distributing torque loads throughout the first and second receiver hitches 24a(b), 26a(b) rather than concentrating such loads on the flange faces and bolts, to reduce risk of fatigue failures.

Each female portion 28a(b), 30a(b) includes first and second attachment flanges 44a(b), 46a(b) and 48a(b), 50a(b), each having a plurality of threaded couplers 68a(b) to rigidly connect the receiver hitch female portion 28a(b), 30a(b) to the original track frame plate P1(P2) and extension track frame inboard plate 70a(b), respectively. Each of first attachment flanges 44a(b), 46a(b), which couple directly to the original track frame plate P1(P2), include a top follower plate 72a(b), 74a(b) extending along the top edges of first attachment flanges 44a(b), 46a(b) which are bolted to the top horizontal portion of the original track frame plate P1(P2), providing additional strength and assisting in alignment and transferring torque loads from the extension track connectors to the original track suspension. In the embodiment, first (forward) attachment flange 44a(b) and corresponding top follower plate 72a(b) are wider than second (aft) attachment flange 46a(b) and second attachment flange follower plate 74a(b), in order to absorb the additional forces typically imposed by impacts on the forward part of the track suspensions.

The assembled length of receiving hitches 24a(b) and 26a(b) define the lateral displacement of lateral track extension system 10.

In the embodiment, the engagement points 68a(b) are threaded nuts welded to the backside of track frame plate P1(P2) to receive threaded bolts. In the embodiment, threaded bolts are selected to match the original track T1 (T2) attachment bolts as much as possible, for ease of logistics. First and second truss bolt extension plates 76a(b), 78a(b) are added to the original track frame plate P1(P2) to provide connection points for corresponding first and second truss bolts 80a(b), 82a(b) without interfering with the original track suspension layout. This is dependent on the particular arrangement of the original track suspension.

First and second truss bolts 80a(b), 82a(b) extend through first and second receiver hitches 24a(b), 26a(b) and engage corresponding first and second truss bolt receivers 84a(b), 86a(b), respectively, provided on original track frame plate P1(P2). Truss bolts 80a(b), 82a(b) pass through receiver hitch male portions 32a(b), 34a(b). In the embodiment, original track T1 (T2) was modified by boring first and second truss bolt receivers 84a(b), 86a(b) and welding backing nuts over the holes to provide adequate strength and thread depth. In the embodiment, first and second truss bolts

80*a*(*b*), 82*a*(*b*) are ⅞ inch stainless steel bolts to provide adequate strength and corrosion resistance.

Each of first and second receiver hitches 24*a*(*b*), 26*a*(*b*) include first and second locking lugs 88*a*(*b*), 90*a*(*b*) and 92*a*(*b*), 94*a*(*b*), respectively, which assist in holding the male portions 32*a*(*b*), 34*a*(*b*) of first and second receiver hitches 24*a*(*b*), 26*a*(*b*) in place and reduce vibration during operation.

In the embodiment, the male portion 34*a*(*b*) of second receiver hitch 26*a*(*b*) is slightly longer than male portion 32*a*(*b*) of first receiver hitch 24*a*(*b*), which is in turn slightly longer than drive shaft extension axle 102*a*(*b*) of drive coupler 96*a*(*b*), which makes alignment easier during installation—each respective portion couples at a different moment so all parts don't have to be precisely lined up at when commencing the coupling procedure.

In the embodiment, D-rings 140*a*(*b*) are coupled to first and second receiver hitch female portions 28*a*(*b*), 30*a*(*b*), which allow use of overhead support to assist in installation and removal.

The extension track system 10 includes a drive coupler 96*a*(*b*). Drive coupler 96*a*(*b*) includes a hub cover 98*a*(*b*) which couples to the original track drive sprocket D1(D2) on the equipment side, a drive bearing assembly 100*a*(*b*) in the extension track assembly 12*a*(*b*), and an extension axle 102*a*(*b*) which rotatingly couples hub cover/torque plate 98*a*(*b*)/116*a*(*b*) to drive bearing assembly 100*a*(*b*). In the embodiment, the drive bearing assembly 100*a*(*b*) includes a bearing hub/race and double bearing 106*a*(*b*) (not visible in figures) coupled to a drive sprocket, which replaces the planetary gear assembly of a stock replacement track assembly. Drive bearing assembly 100*a*(*b*) transmits the torque received from the original track drive sprocket D1 (D2) through extension axle 102*a*(*b*) to the continuous track 108*a*(*b*) of extension track assembly 12*a*(*b*) via the extension track assembly drive sprocket 110*a*(*b*). Extension axle 102*a*(*b*) is keyed to a rotating bearing coupled to the extension track drive sprocket 110*a*(*b*). Extension axle 102*a*(*b*) includes a square end block 112*a*(*b*), corresponding to the square receiver 114*a*(*b*) of drive coupler torque plate 116*a*(*b*). The square shape transmits torque to the extension axle 102*a*(*b*), but other shapes could be used, for example oval, star and other shapes.

In the embodiment, drive coupler 96*a*(*b*) includes a hub cover 98*a*(*b*) coupled to the rotating portion of original track drive sprocket D1 (D2), over the drive sprocket. Hub cover 98*a*(*b*) includes an inner connection flange 118*a*(*b*) which couples directly to the drive sprocket D1(D2) base portion, a spacer/sidewall 120*a*(*b*) extending out from the inner connection flange 118*a*(*b*), and an outer connection flange 122*a*(*b*). In the embodiment, outer connection flange 122*a*(*b*) is closed, but may be open to provide direct access to the drive sprocket D1 (D2) for inspection and maintenance without having to remove the hub cover 98*a*(*b*). However, the having outer connection flange 122*a*(*b*) closed prevents debris from getting into the drive sprocket/hub assembly. The hub cover assembly 98*a*(*b*) can be left installed when the extension track assembly 12*a*(*b*) is not attached without interfering with normal operation of the equipment.

Drive coupler torque plate 116*a*(*b*) is coupled to hub cover outer connection flange 122*a*(*b*) by threaded bolts 126*a*(*b*). The threaded bolt holes are aligned with hub cover inner flange 118*a*(*b*) retainer bolts and sized to provide access through the bolt holes to the bolts connecting the hub cover inner flange 118*a*(*b*) to the drive sprocket assembly D1 (D2). The retainer bolts 136*a*(*b*) connecting hub cover 98*a*(*b*) to drive sprocket D1 (D2) through inner flange 118*a*(*b*) utilize the original drive sprocket retainer bolt holes, so are the same thread but longer than the original drive sprocket connector bolts.

Drive coupler hub cover 98*a*(*b*) may include bolt sleeves (not shown) extending between the hub cover inner connection flange 118*a*(*b*) and outer connection flange 122*a*(*b*) to retain the connector bolts and make installation and removal easier.

Extension track assembly 12*a*(*b*) can be used for any piece of equipment with original track T1(T2) having a matching track pitch. The connector arrangement for the first and second receiver hitch female portion first attachment flanges 44*a*(*b*), 46*a*(*b*), and the connector/bolt pattern and size of the drive coupler hub cover 98, may be varied to accommodate the particular model/internal arrangement of the original track T1(T2), which varies for families of tracked equipment, such that a particular size of extension track assembly 12*a*(*b*) could be universally adaptable to any similarly sized tracked equipment.

In the embodiment, the extension track assembly 12*a*(*b*) is laterally displaced approximately six inches from the original track T1(T2). This displacement provide a substantial increase in lateral stability, but the inventors have also found that this spacing, which is slightly less than the continuous track width, also provides additional effective floatation due to the compression of compactible/semi-compactible ground/surface material between the tracks. Therefore, the increased floatation effect (i.e. reduced ground pressure) is greater than indicated by merely adding the additional track surface area (sometimes referred to as the "bridging effect"). However, the selected lateral displacement of the extension track system 10 may be varied for particular applications. Greater lateral displacement may require additional supporting members. The extension track system may include horizontal stiffeners, 138*a* and 138*b*, coupling first extension track first receiver hitch 24*a* to first extension track second receiving hitch 26*a*, and second extension track first receiver hitch 24*b* to second extension track second receiving hitch 26*b*, respectively, in order to provide increased rigidity to the system.

The extension track system may include vertical stiffeners, 138*a* and 138*b*, couplable between first extension track first and second receiving hitches 24*a* and 26*a*, and second extension track first and second receiving hitches 24*b* and 26*b*, respectively, to the equipment superstructure, to provide increased load support to the system, especially for applications where the equipment is being used to span open channels, such that extension track assemblies 12*a*, 12*b* are anticipated to engage either side of the channel with the original tracks T1, T2 unsupported over the open portion of the channel.

As demonstrated in FIGS. 1-27, the removable track extension system 10 can be installed and removed without having to use jacks to raise the equipment completely off the floor—merely unloading the suspension is sufficient to allow the extension assemblies to be moved into alignment and coupled to the respective lateral tracks.

Referring to FIGS. 1-27, a universal removable extension track system may include a tracked vehicle having opposed first and second lateral tracks with first and second alignment cups 18*a*(*b*) and 20*a*(*b*) and attachment points 68*a*(*b*) provided, in combination with a first and second extension track assembly 12*a* and 12*b*.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A universal removable lateral track extension system for tracked equipment, the tracked equipment including a forward end and aft end, first lateral track with a first lateral track frame plate, a plurality of track rollers, a drive sprocket assembly, and a continuous track, the first extension track assembly extending from a forward end to an aft end and removably couplable to and outboard of the first lateral track at a selected displacement width, the first extension track assembly comprising:
   a first extension track frame and a first extension track frame plate extending from a first extension track frame plate first portion corresponding to a forward portion of the first extension track frame to a first extension track frame plate second portion corresponding to an aft portion of the first extension track frame, the first extension track frame plate including a first and second threaded alignment channels disposed in the first extension track frame plate first and second portions, respectively;
   a plurality of first extension track rollers rotatably coupled to the first extension track frame plate;
   a first extension track first receiving hitch couplable between the first extension track frame plate first portion and the first lateral track frame plate, and a first extension track second receiving hitch couplable between the first extension track frame plate second portion and first lateral track frame plate, each of the first extension track first and second receiving hitches of the same length and defining the lateral displacement of the lateral track extension system;
   a first extension track drive coupler couplable to the first lateral track drive sprocket assembly; and,
   a first extension track continuous track extending around the first extension track drive coupler and track rollers.

2. The system of claim 1, further comprising:
   first extension track first and second alignment cups connected to the first lateral track frame plate proximate the forward and aft ends, respectively, the first extension track first and second alignment cups positioned to align with the corresponding first extension track first and second threaded alignment channels.

3. The system of claim 2, further comprising:
   the first extension track drive coupler including a first extension track drive bearing assembly and connected first extension track drive sprocket in line with the first extension track track rollers, a first extension track drive sprocket connector connectable to the first lateral track drive sprocket assembly, and a first extension track extension axle removably couplable from the first extension track drive sprocket connector to the first extension track drive bearing assembly.

4. The system of claim 3, further comprising:
   the tracked equipment further including a second lateral track opposite and mirroring the first lateral track and including a second lateral track frame plate, a plurality of track rollers, a second lateral track drive sprocket assembly, and a second lateral track continuous track,
   a second extension track assembly comprising a mirror image of the first extension track and extending from a forward end to an aft end and removably couplable to and outboard of the second lateral track at the selected displacement width, the second extension track assembly further comprising:
   a second extension track frame and a second extension track frame plate extending from a second extension track frame plate first portion corresponding to a forward portion of the second extension track frame to a second extension track frame plate second portion corresponding to an aft portion of the second extension track frame, the second extension track frame plate including a first and second threaded alignment channels disposed in the second extension track frame plate first and second portions, respectively;
   second extension track first and second alignment cups connected to the second lateral track frame plate proximate the forward and aft ends, respectively, the second extension track first and second alignment cups positioned to align with the corresponding second extension track first and second threaded alignment channels;
   a plurality of second extension track rollers rotatably coupled to the second extension track frame plate;
   a second extension track first receiving hitch couplable between the second extension track frame plate first portion and the second lateral track frame plate, and a second extension track second receiving hitch couplable between the second extension track frame plate second portion and second lateral track frame plate, each of the second extension track first and second receiving hitches of the same length and defining the lateral displacement of the lateral track extension system;
   a second extension track drive coupler couplable to the second lateral track drive sprocket assembly, the second extension track drive coupler including a second extension track drive bearing assembly and connected second extension track drive sprocket in line with the second extension track track rollers, a second extension track drive sprocket connector connectable to the second lateral track drive sprocket assembly, and a second extension track extension axle removably couplable from the second extension track drive sprocket connector to the second extension track drive bearing assembly; and,
   a second extension track continuous track extending around the second extension track drive coupler and track rollers.

5. The apparatus in claim 4, further comprising:
   a tracked vehicle including the first and second opposed lateral tracks configured to removably receive the first and second extension track assemblies.

6. The apparatus in claim 4, further comprising:
   the first and second extension track assemblies further including respective first and second extension track horizontal stiffeners, each horizontal stiffener comprising first and second stiffener members couplable between the lateral tracks and extension track assembly frame plate, wherein the horizontal stiffener first and second stiffener members of the respective first and second extension track horizontal stiffeners are coupled together in a horizontal crisscross orientation.

7. The apparatus in claim 4, further comprising:
the first and second extension track assemblies further including respective first and second extension track vertical stiffeners, each of the respective first and second extension track vertical stiffeners including one or more stiffener members couplable between the respective first and second extension track assembly frame plates and a respective lateral location on a tracked vehicle to receive the first and second track extensions, each of the respective lateral locations disposed higher than the respective first and second extension track frame plates.

\* \* \* \* \*